(12) United States Patent
Rossettini et al.

(10) Patent No.: US 9,809,327 B2
(45) Date of Patent: Nov. 7, 2017

(54) DEVICE FOR MOVING OR REMOVING ARTIFICIAL SATELLITES

(71) Applicant: D-ORBIT S.R.L., Milan (IT)

(72) Inventors: Luca Rossettini, Vicenza (IT); Giuseppe Jussef Tussiwand, Wasserburg am Inn (DE); Renato Panesi, Massa (IT); Thomas Panozzo, Montrouge (FR)

(73) Assignee: D-ORBIT S.R.L., Milan (IT)

( * ) Notice: Subject to any disclaimer, the term of this patent is extended or adjusted under 35 U.S.C. 154(b) by 0 days.

(21) Appl. No.: 15/364,896

(22) Filed: Nov. 30, 2016

(65) Prior Publication Data

US 2017/0081047 A1 Mar. 23, 2017

Related U.S. Application Data

(63) Continuation of application No. 14/232,869, filed as application No. PCT/EP2012/064123 on Jul. 18, 2012.

(30) Foreign Application Priority Data

Jul. 18, 2011 (IT) .............................. MI2011A1332

(51) Int. Cl.
*B64G 1/24* (2006.01)
*B64G 1/26* (2006.01)
(Continued)

(52) U.S. Cl.
CPC ............... *B64G 1/242* (2013.01); *B64G 1/10* (2013.01); *B64G 1/26* (2013.01); *B64G 1/40* (2013.01); *B64G 1/403* (2013.01); *B64G 1/64* (2013.01)

(58) Field of Classification Search
CPC .......................... B64G 1/641; B64G 2001/643
See application file for complete search history.

(56) References Cited

U.S. PATENT DOCUMENTS 3,652,042 A * 3/1972 Welther ................... B64G 1/00
244/173.3
3,907,225 A 9/1975 Welther
(Continued)

FOREIGN PATENT DOCUMENTS

EP 0 780 298 A1 6/1997
FR 2 814 817 A1 4/2002
(Continued)

OTHER PUBLICATIONS

Schonenborg R., "Solid Propellant De-orbiting for Constellation Satellites", Proceedings of the 4th International Spacecraft Propulsion Conference (ESA SP-555), Jun. 2-9, 2004, Chia Laguna (cagliari), Sardinia, Italy, published on CDROM., p. 82.1-82.6, 2004, XP002669966, Retrieved from the Internet: http://articles.adsabs.harvard.edu/full/2004ESASP.555E..82S/0000082.006.html (retrieved on Feb. 20, 2012).
(Continued)

*Primary Examiner* — Brian M O'Hara
(74) *Attorney, Agent, or Firm* — Vorys, Sater, Seymour and Pease LLP

(57) ABSTRACT

A method for using a device for coupling with a space satellite before the satellite is launched for the purpose of de-orbiting the satellite and/or returning it to Earth. The device includes:
controller for controlling the device;
propulsion system operatively connected with the controller;
receiver for receiving control signals operatively connected with the controller;
powering system for electrically powering the device;
(Continued)

coupler for mechanically coupling the device with the satellite before the satellite is launched.

The propulsion system is enabled by the controller on receipt of control signals for deorbiting the satellite and transferring it to a given orbit.

15 Claims, 21 Drawing Sheets

(51) Int. Cl.
  *B64G 1/40* (2006.01)
  *B64G 1/64* (2006.01)
  *B64G 1/10* (2006.01)

(56) References Cited

U.S. PATENT DOCUMENTS

| | | | |
|---|---|---|---|
| 5,056,740 A | 10/1991 | Roth et al. | |
| 5,421,540 A * | 6/1995 | Ting | B64G 1/1078 244/158.1 |
| 2005/0063252 A1 | 3/2005 | Wulfken | |
| 2007/0120020 A1 | 5/2007 | Engelhardt | |
| 2009/0211227 A1 | 8/2009 | Loehr | |
| 2009/0321579 A1 | 12/2009 | Dorman | |
| 2012/0318925 A1 | 12/2012 | Gibson et al. | |

FOREIGN PATENT DOCUMENTS

| | | |
|---|---|---|
| JP | 4-297400 A | 10/1992 |
| JP | H789497 A | 4/1995 |
| JP | 2005519268 A | 6/2005 |
| JP | 2009204419 A | 9/2009 |
| JP | 2010527423 A | 8/2010 |
| WO | 2013/123047 A1 | 8/2013 |

OTHER PUBLICATIONS

Janovsky R. et al., "End-Of-Life De-orbiting Strategies for Satellites", DGLR Jahrbuch 2002, pp. 1-10., Deutscher Luft-und Raumfahrtkongress, Stuttgart, Sep. 23-26, 2002, DGLR-JT2002-028, 2002, XP002669967, Retrieved from the Internet: http://www.dlr.de/portaldata/55/Resources/dokumente/sart/dglr-2002-028.pdf (retrieved on Feb. 20, 2012).

International Search Report dated Sep. 11, 2012 for PCT/EP2012/064123 to D-Orbit S.R.L. filed Jul. 18, 2012.

Rocket propellant, Wikipedia, URL: <https://en.wikipedia.org/wiki/Rocket_propellant>, retrieved from the Internet Dec. 20, 2015.

European Office Action for EP Application No. 12741284.9, dated May 19, 2015, seven pages.

European Office Action for EP Application No. 12741284.9, dated Feb. 10, 2016, seven pages.

* cited by examiner

DEVICE FOR MOVING OR REMOVING ARTIFICIAL SATELLITES

CROSS-REFERENCE TO RELATED APPLICATIONS

This is a continuation application of US patent application Ser. No. 14/232,869 filed Jan. 14, 2014 which is a §371 National Stage Application of International Application No. PCT/EP2012/064123 filed 18 Jul. 2012, claiming the priority of Italian Patent Application No. MI2011A001332 filed on 18 Jul. 2011.

The present invention relates to a device to remove artificial satellites from the space or to move artificial satellites to a different space orbit. In particular, the present invention relates to a device for controlled and safe removal of satellites, namely for the de-orbiting of artificial satellites or space vehicles, wherein the term "de-orbiting" means a controlled and rapid return of said artificial satellites, or space vehicles, from low orbits in the Earth's atmosphere to pre-established sites on Earth. According to another aspect, the present invention relates to a device capable of effecting the re-orbiting of artificial satellites, or space vehicles, that is a controlled and rapid transfer of said artificial satellites, or space vehicles, from their orbits to a parking orbit.

More in particular, the present invention relates to a device for moving artificial satellites, or space vehicles, and/or removing them from the mission orbit at the end of their useful life or when they become faulty.

In a further aspect, the present invention relates to a device capable of serving as a backup propulsion system for changing of the orbital position of artificial satellites or space vehicles.

In another aspect, the present invention relates to a method to remove a space satellite from its space orbit or move said satellite to a different space orbit. More in particular, the present invention relates to a method to operate the de-orbiting or the re-orbiting of a space satellite, or space vehicle, by an independent moving/removing device provided on said space satellite or space vehicle.

The terms "artificial satellite", "space satellite" or "space vehicle" refer, for the purposes of the present invention, to artificial satellites or vehicles able to orbit or to move in the space from low orbits in Earth's atmosphere.

The term "mission orbit" refers, for the purposes of the present invention, to the orbit assigned to the satellite or space vehicle for the operations required during its stay in space.

The term "low orbit" refers, for the purposes of the present invention, to a low Earth orbit (LEO), i.e. a circular orbit at an altitude between the atmosphere and the Van Allen belt, from 200 to 2,000 kilometres away from the Earth's surface.

The term "high orbit" refers, for the purposes of the present invention, to a medium Earth orbit (MEO), or a geosynchronous orbit (GSO) or a geostationary Earth orbit (GEO). An MEO is an orbit coming between an LEO and a GEO, approximately 10,000 km away from the Earth's surface. A GSO is an orbit around the Earth with an orbital period that is the same as the period of the Earth's sidereal rotation. A GEO is a particular type of GSO and is an equatorial circular orbit at a distance of approximately 36,000 kilometres above the equator.

The term "parking orbit" refers, for the purposes of the present invention, to an orbit at which the artificial satellite or space vehicle can remain without causing damage or occupying space that is useful to other artificial satellites or space vehicles.

The first artificial satellite was launched in 1957. Since then, more than 6,000 satellites have been launched, only 800 of which are currently in use. The majority of the satellites that are no longer operational continue to orbit around the Earth and it is impossible to control their trajectory.

With the growing number of satellites being launched, there is a consequent reduction in the space available for positioning new satellites in orbit. In addition, the non-operational and/or uncontrolled satellites have a high likelihood of colliding with one another and exploding. This poses a number of problems because approximately 50% of the traceable objects in orbit are generated by explosions or collisions in the space. As a consequence, there are approximately half a million pieces of space debris currently moving at more than 30,000 km an hour around the Earth, polluting the orbital spaces that are most suitable from the scientific, technical and commercial standpoints. Every new satellite launched into orbit increases not only the number of objects in space, but also the amount of uncontrolled debris resulting from the continuous collisions and explosions to which the abandoned debris is liable.

For the class of low orbits (LEO), the rapidly growing amount of debris constitutes a threat and a far from negligible source of pollution. This orbital region is relatively small and nearly saturated, with a considerable risk of collisions between debris and spatial objects that are still in use. There is a risk of severe damage to artificial satellites, or even their total destruction, with the consequent failure of the corresponding space missions. The uncontrolled increase in this space debris can lead to what is known as the Kessler syndrome, i.e. when a certain density of the debris in orbit is reached, there could be a chain of collisions that would prevent any space activity or use of satellites for several generations. In addition, the space objects left in the lower orbits return to the Earth's atmosphere and fall onto the surface of the planet months or years after any orbital control systems available on board the satellite have used up their propellant, or when a satellite may be out of control due to a malfunction, meaning that their re-entry is uncontrolled and thus places any object or human being at risk.

In fact, if such debris is not completely destroyed as it moves through the atmosphere—as may be the case, depending on the materials used in the spacecraft's construction and the dynamics of its re-entry—it can drop at great speed to Earth, becoming a hazard to human beings, buildings or infrastructure (e.g. gas tanks, electric power lines, nuclear reactors, etc.). Even disregarding any direct impact with objects and human beings, the uncontrolled re-entry of debris can be highly risky. In fact, some satellites may have radioactive or highly toxic material on board (such as propellants containing hydrazine), which could be dispersed in the atmosphere over densely-populated areas. Nowadays, the number of objects falling to Earth from space already averages one a day and nobody can predict when or where the impact will take place. Generally speaking, the speed of impact ranges from approximately 30 km/hour for lightweight objects to more than 300 km/hour for heavier items.

The space objects placed in medium or high orbits (MEO and GEO) are not slowed down by the upper layers of the Earth's atmosphere (the exosphere), so they do not fall towards the Earth's surface. Artificial satellites consequently occupy commercially useful orbital segments for a very long time. At the end of their working life, which is typically 15 years, they become waste and are abandoned uncontrolled, and this prevents the positioning of any other space object in their proximity. Given the importance of the orbits in question and the limited space available, the satellites must be relocated to a cemetery orbit or parking orbit before they come to the end of their working life. This is typically a high orbit of no use for the purposes of space missions. Said repositioning of the satellite is effected using the same propulsion systems as for orbital manoeuvres, if they are available on board. A part of the propellant stored in the tanks can be set aside for this purpose, consequently limiting the working life of the satellite and sacrificing a part of the propellant loaded on board to enable the parking manoeuvres to be completed. Re-orbiting an artificial telecommunications satellite involves interrupting its commercial operations for approximately 6 months. For a satellite with an initial mass of approximately a thousand kilograms and a seven-year mission, this means an economic loss of approximately 10,000,000 US $. In the event of any problems, such as a malfunctioning of the thrusters used, a shortage of propellant, the lack of a suitable propulsion system, or a mechanical failure, the satellite remains in its position practically forever, preventing its replacement with new, technologically more advanced satellites. Several simulations have estimated that each artificial satellite in the geostationary orbit passes within approximately 50 meters of another space object every year, with the related high risk of impact.

The "Convention on International Liability for Damage Caused by Space Objects" establishes that whoever launches an object into space is responsible for any damage caused by the object, both in Space and on Earth. The IADC (Inter Agencies space Debris Coordination Committee) establishes that a generic space vehicle must be manoeuvred at the end of its working mission so as to prevent it interfering with other space systems in orbit and, in the case of artificial satellites in low orbits, their re-entry in the atmosphere must be guaranteed within 25 years of the end of their working life.

Generally speaking, the cost incurred for a artificial satellite in a GEO orbit to comply with the IADC requirements amounts to approximately 10%-15% of the total cost of the satellite. Space debris thus represents a growing threat to scientific and commercial developments in orbit. It would consequently be useful to produce a device capable of safely de-orbiting or moving (re-orbiting) artificial satellites and space objects in orbit in general that have reached the end of their working life, in a reliable and controlled manner.

There are other known devices for de-orbiting space objects or moving them to parking orbits. They usually comprise passive devices, i.e. they have no control over the timing, the trajectory and final destination of the object to be moved.

U.S. Pat. No. 6,655,637 describes a device to launch into Space that can grasp objects already in orbit and make them de-orbit towards Earth by means of an inflatable re-entry module. This is typically a spherical object of considerable dimensions so as to guarantee that it is attracted by the Earth as a result of its interaction with the residual layers of atmosphere. This device has the disadvantage, however, of having to carry the object to be removed into the atmosphere without being able to guarantee its control during the re-entry phase or any substantial reduction of the related re-entry times. It consequently cannot even guarantee that the orbit encountered during the "falling" phase will not place it at risk of colliding with other satellites. Moreover, this device is unable to shift objects located in high orbits into a parking orbit. A further drawback lies in that the recovery operations demand the completion of delicate orbital manoeuvres and dedicated launches for each object to be removed, which makes the recovery process costly and risky.

U.S. Pat. No. 5,120,008, describes a device that exploits the solar radiation passing through lenses to dissolve space debris. This device has the disadvantage of only being useful for small items of debris that would re-enter the atmosphere spontaneously anyway within a relatively short time. In addition, the device has to be equipped with a thruster that can be reignited to reach the various pieces of debris in orbit. Another drawback lies in the need to arrange for a dedicated launch to reach the orbit(s) where the debris identified has to be dissolved, here again making the clean-up process costly and risky.

U.S. Pat. No. 4,991,799 describes an apparatus consisting of a spacecraft rotating around its own axis with a plurality of panels having an ample surface area against which the space debris should impact and remain attached when the sweeper apparatus moves on. Like those mentioned previously, this device has the disadvantage of requiring a re-ignitable thruster to reach the various pieces of debris in orbit. Another disadvantage lies in that it is only useful for small items, which would re-enter the atmosphere spontaneously anyway within a relatively short time. A further disadvantage lies in the need to arrange for a dedicated launch to reach the orbit(s) from which the debris identified has to be eliminated, here again making the clean-up process expensive and hazardous.

U.S. Pat. No. 5,082,211 describes a "tethered" device for de-orbiting spatial debris. This device consists of a long wound cable that can be unwound at the beginning of the de-orbiting phase. The method can only be applied to debris in low orbits and it uses the residual atmosphere at these altitudes to gradually slow down the debris and make it re-enter the atmosphere. The main disadvantage of this solution lies, however, in that it is impossible to guarantee any control over the trajectory or the site of impact on Earth. In addition, the operations for unwinding and stabilizing the cable are highly complex and costly.

U.S. Pat. No. 7,093,800 describes a method for handling a satellite at the end of its working life using a part of the propellant loaded on board for de-orbiting purposes. The main disadvantage of this method lies in the need for the satellite to still be in good working order when the time comes for de-orbiting. It is also only feasible to de-orbit satellites equipped with re-ignitable thrusters burning liquid propellants. Another disadvantage stems from the need to have a mass of propellant and an additional volume inside the fuel tanks for use in the de-orbiting manoeuvre, thereby reducing the satellite's useful life. The reliability of this system necessarily depends on the reliability of the liquid propellant engines and the control system.

U.S. Pat. No. 6,629,673 describes a hybrid-solid fuel thruster used to move a transfer vehicle with people on board. This device is re-ignitable and is controlled by the spacecraft to which it is connected. This thruster enables an emergency displacement to be effected, but the control of the thruster requires a proper functionality of the vehicle to be moved and its control system. CN 2011659160 describes a method for using a cluster of four solid propellant engines for orbital transfers. The main disadvantage of these devices lies in their lack of autonomy since they have to be controlled by the space vehicle with which they are associated, so their reliability depends on the latter.

U.S. Pat. No. 6,024,328 describes a method for controlling a satellite by means of a liquid bipropellant thruster. This system requires tanks for the propellant, a perfectly sealed tank for the pressurised gas used to drive the fuel and oxidant into the combustion chamber, and valves and other components. The number of components in the system contributes to reducing its overall reliability and further increases the mass having to be launched, and consequently the costs involved. Another disadvantage consists in the space occupied inside the spacecraft having to be de-orbited.

Other known devices and methods are described in non-patent literature for de-orbiting space objects.

Janosky R. et al., "End-Of-Life De-Orbiting Strategies for Satellites", DGLR Jahrbuch 2002, 1-10, Deutscher Luft and Raumfahrtkongress, Stuttgart, 23-26 Dept. 2002, describes a method for de-orbiting satellites. It provides an overview of different types of propulsion means suitable for de-orbiting satellites. In particular, it specifies that the most suitable propulsion systems to operate the de-orbiting are solid propellant propulsion means. This document, however, does not describe how the system works or shall be configured. Moreover, the method is described only to operate the de-orbiting of satellites that work in a LEO orbit. The propulsion means are described as a part of a satellites or as the same propulsion means of the satellites themselves, so it is not described a de-orbiting device autonomous with respect to the satellite.

Schonenborg R., "Solid Propellant De-orbiting for Constellation Satellites", Proceedings of the 4$^{th}$ International Spacecraft Propulsion Conference (ESA SP-55), 2-9 Jun. 2004, Chia Laguna (Cagliari), describes the use of a de-orbiting system provided with solid propellant propulsion means. The paper describes the use and the positioning of solid propellant propulsion means in the Iridium satellites. The most relevant disadvantage of this system relates to the connection with the satellite, which does not allow a control of the de-orbiting process when the propeller is ignited.

Thus, although the known devices adopt solutions comprising propulsion systems that can be used for de-orbiting purposes, they are not able to ensure a cost-effective and really reliable operation or are not able to control the de-orbiting/re-orbiting operations when they are started. In fact, the described devices and methods do not really involve an autonomous de-orbiting/re-orbiting device and, if so, do not disclose the interaction between said device and the satellite to re-orbit/de-orbit. Moreover, these devices demand ad hoc launches to identify the objects to be de-orbited, which increases the cost involved in these operations. In addition, they comprise a large number of components with complex interactions between them, meaning that the real overall reliability of the system is drastically reduced.

Therefore the need is felt for a device and a method for the removal of objects orbiting into the space that is autonomous with respect to said objects but coupled with themselves.

Also the need is felt for a device and a method capable of guaranteeing that the operations involved in said removal are cost-effective.

It would be desirable for said device and method to be capable of preserving a high degree of reliability for the whole duration of the mission of the space object to be removed.

It would also be desirable for said device and method to be capable of operating independently, without needing to interact with the space object to be removed.

It would likewise be desirable for said device and method to be capable of guaranteeing the removal of the object from its orbit in a safe and controlled manner.

Within the context of the above technical aim, one object of the present invention is to provide an autonomous device capable of minimizing or eliminating the drawbacks deriving from the orbiting in Space of objects, such as artificial satellites, that are no longer in use.

Another object of the present invention is to provide an autonomous device capable of guaranteeing a high degree of reliability throughout its life-cycle so as to ensure its proper operation at any moment.

Another object, forming part of the above-mentioned aim, is to provide an autonomous device comprising a minimum number of parts, and consequently entailing limited production and assembly costs. In addition, another object of the present invention is to provide a device capable of completing the procedure for the removal of the object from its orbit in a safe and controlled manner.

The term "autonomous" refers, for the purposes of the present invention, to a device that is coupled with the satellite to be moved or removed but it works in autonomy without using any system of the satellite for its de-orbiting/re-orbiting operations.

Furthermore, another object of the present invention relates to a method for removing a space satellite from its space orbit or move said satellite to a different space orbit in a remote way by an independent moving/removing device coupled with the satellite itself.

The above objects are achieved by a device according to claim 1. In particular, the above objects are achieved by a device to be coupled to a space satellite before launch to remove said satellite from space or move said satellite in a different space orbit by remote control means or by said device, characterized in that said device is independent with respect to said satellite and to said remote control means, said device comprising:
  on-board control means of said device;
  means for receiving control signals from said remote control means or means for emitting control signals to activate the moving/removing sequence, operatively connected with the on-board control means;
  propulsion means operatively connected with the on-board control means, said propulsion means being activated by said on-board control means upon receiving said control signals to remove said satellite from space in a predefined Earth area or move said satellite in a predefined different space orbit;
  electric power supply means for said device, to make independent said device from said satellite;
  pre-launch mechanically coupling means of said device to said satellite;
  means to mitigate the misalignment of the thrust vector, operatively connected with said on-board control means.

The term "remote control means" refer, for the purposes of the present invention, to software and/or hardware means able to send the control signals to the device. Said software and hardware shall be part of another spacecraft or an orbiting space station, or a control station located on Earth.

With the above-described characteristics, the device according to the invention can effect the de-orbiting or re-orbiting of the satellite with which it is associated independently with respect to said satellite and its state of life. Said de-orbiting or re-orbiting may also be remote-controlled by remote control means transmitting from another spacecraft or orbiting space station, or from a control station located on Earth. The on-board control means of the device effect the de-orbiting or the re-orbiting procedure in a few straightforward steps.

The simultaneous displacement of the device and satellite enables the device to dispose appropriately of the satellite with which it is coupled at the end of the latter's mission. In particular, said disposal process is achieved by moving the satellite from its operational orbit, or by de-orbiting the satellite towards Earth. When the necessary control signals are received, the device according to the present invention is able to clear the space of the orbit previously occupied by the satellite with which it is associated, and thereby prevent it from interfering with other satellites or spacecraft orbiting in the vicinity. In particular, the re-entry procedure is achieved in a safe and controlled manner, avoiding any damage due to collision and impact with people or property on Earth, or with other space objects orbiting nearby, identifying a predefined safely Earth area in which the satellite will impact.

The means to mitigate the misalignment of the thrust vector allow the control of the de-orbiting/re-orbiting trajectory when the propeller is ignited, without the use of systems belonging to the satellite. In particular, by mitigating the misalignment the device can be ignited only one time without reigniting the propeller to control the trajectory of the device and the satellite.

Preferably, the device comprises means for detecting and/or controlling the attitude of the satellite, operatively connected with the means to mitigate the misalignment. More preferably, the means to mitigate the misalignment comprise means for active and/or passive control of the thrust vector which effect the alignment of said thrust vector.

In this way, the device controls the attitude and/or the thrust vector and/or the misalignment of the satellite during the propulsion of the device, allowing the satellite to move on the predefined trajectory on Earth or on new orbit as calculated. In particular, said control and alignment allow to minimizing the necessary propellant.

Preferably, the means for active and/or passive control of the thrust vector effect an adjustable and/or a mobile connection between the satellite and the device to effect the alignment of the thrust vector. In this way, the control of the misalignment does not involve the propulsion means and the alignment of the thrust vector can be done simply and economically.

Preferably, the means for detecting and/or controlling the attitude of the satellite are operatively connected with the on-board control means and effect the directional control of the device and of the satellite when the propulsion means are activated. In this way, the device has an active control over the trajectory allowing the device to complete the de-orbiting/re-orbiting operations safety and in few steps.

Preferably, the device comprises safety ignition means operatively connected with the on-board control means to receive the ignition control signal and to operate the ignition of the propulsion means. In this way, the ignition of the device is possible only if a safety signal is received by the device, thus preventing a spontaneous ignition or an unauthorized intrusion in the device systems.

Preferably, the device comprises telecommunication means, operatively connected with the on-board control means, for receiving and/or sending data from the device to the remote control means; the telecommunication means comprising at least the means for receiving control signals and/or at least means for transmitting data.

Preferably, the on-board control means comprise means for emitting pre-programmed control signals and/or means for calculating said control signals to be sent to the means for receiving control signals. In this way, the device can be set in an autonomous operation starting the ignition sequence by itself.

Preferably, the device comprises first sensor means, operatively connected with the on-board control means, for the detection of other objects within a safety zone defined around the device and/or the satellite.

More preferably, the device comprises second sensor means, operatively connected with the on-board control means, for the detection of impact damages on the device and/or on the satellite. More preferably, the device comprises third sensor means, operatively connected with the on-board control means, for the detection of failures of the satellite.

More preferably, the device comprises fourth sensor means, operatively connected with the on-board control means, for detecting the orientation over the time of the device and/or for detecting the orbit of the device and/or for detecting the space position of the device.

Preferably, the device comprises means of communication with the satellite, operatively connected with the on-board control means; the means of communication communicating satellite failures and/or communicating control signals for the device.

More preferably, the device comprises means for monitoring the state of the device itself, operatively connected with the on-board control means, and for sending said state to the remote control means. In this way, the device is completed with means and sensors capable of detecting any anomalies in the operation of the device itself or of the artificial satellite with which it is associated, which advantageously enable the device to dispose of malfunctioning satellites for which re-entry would no longer be possible.

In the case of a satellite severely damaged during its working life, the device according to the present invention enables the damaged satellites to be moved into a parking orbit, or induced to re-enter the Earth's atmosphere, thereby considerably reducing the risk of collision with other satellites.

The proximity sensors avoid collisions with any other (even previously unknown) objects, should they come within a given safety distance away from the satellite. The device according to the present invention thus eliminates the risk of the satellite accidentally colliding with other unknown objects during its life cycle in orbit.

Preferably, the electric power supply means comprise at least a rechargeable power source. In this way, the device has energy independence with respect to the satellite even in case of failure of the satellite or of the electric source of the power supply means of the device.

Preferably, the coupling means effect an adjustable connection between the satellite and the device. More preferably, the coupling means comprise the active and/or passive control of the thrust vector to effect said adjustable and/or a mobile connection between the satellite and the device for the alignment of the thrust vector. In this way, the misalignment can be done also with passive control means without using any auxiliary engines to control and align the device during the move.

Preferably, the propulsion means comprise at least solid propellant engine and at least an igniter for the solid propellant engine; said igniter being operatively connected with the on-board control means for receiving the ignition instant. More preferably, the propulsion means comprise one or more independent cartridges or charges provided with solid propellant.

Alternatively, the propulsion means comprise hybrid propulsion means or gel propellant propulsion means.

The above stated objects are achieved also by a method according to claim 22. In particular, the above objects are achieved by a method to remove a space satellite, provided with an independent moving/removing device, from its space orbit or move said satellite to a different space orbit by a remote control means or by said device, characterised by comprising at least the following steps:

calculating, through said remote control means or by said device, a desired new space orbit or a desired trajectory causing to an impact Earth area, respectively;

calculating, through the remote control means or by said device, the instant to activate the moving/removing device to get the desired new orbit or trajectory based on the actual orbit of the satellite;

sending from said remote control means to said moving/removing device a control signal or starting the de-orbiting/re-orbiting procedure by said device to move the satellite to the calculated new orbit or trajectory;

igniting the propulsion means of the moving/removing device at the calculated instant when it receives the control signal.

With the above-described characteristics, the method according to the invention allows to implement the action of de-orbiting/re-orbiting a satellite by an associated autonomous device. Said method allows a simple and controlled de-orbiting/re-orbiting of the satellite, by calculating "a priori" a safety impact area on the Earth or a new space orbit.

Preferably, the method comprises also the step of sending a safety signal from said remote control means to said means for receiving control signals of said moving/removing device to activate an operative state before sending said control signals to move said satellite to said calculated new orbit or trajectory.

In this way, the start of the de-orbiting/re-orbiting operations is possible only if a safety signal is sent to the device, thus preventing the spontaneous ignition or an unauthorized intrusion on the device.

Further characteristics and advantages of the present invention will become clear from the following description of preferred embodiments, non-limiting examples of which are illustrated in the attached Figures, wherein.

Figure 1:
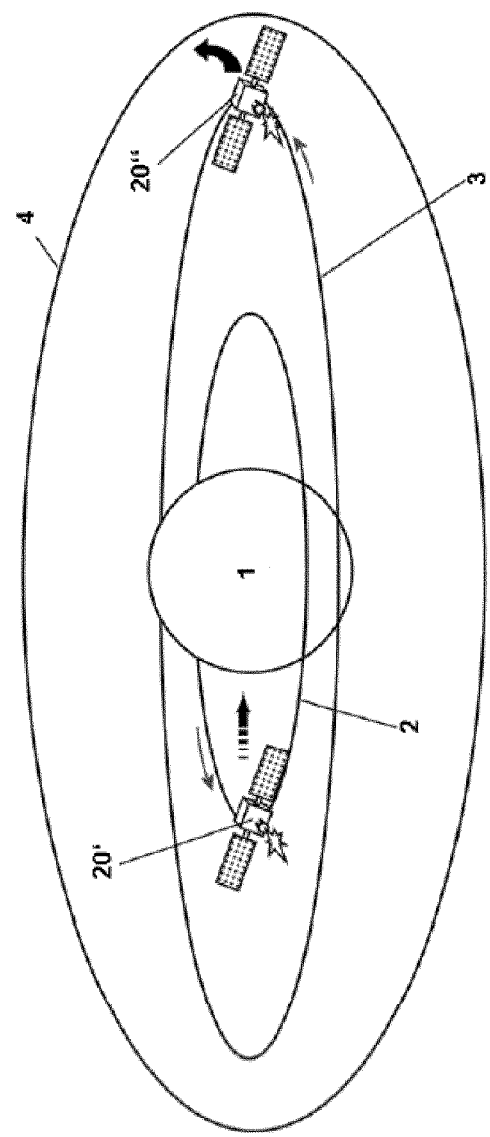
FIG. 1 is a schematic representation of the types of orbit used for satellites and of the de-orbiting methods adopted with the device according to the present invention.

The device according to the invention is described in detail in the following description. FIG. 1 schematically shows a device according to the present invention associated with two different types of satellite 20', 20", orbiting around a celestial body 1, such as Earth. In particular, the satellite 20' operates in a low orbit (LEO) 2, and has to be de-orbited towards the Earth's surface within a given spatial and temporal de-orbiting window. During the de-orbiting process, the position and orientation of the device-satellite system must ensure a safe and controlled re-entry of the system when the device according to the present invention is enabled. A second satellite 20" operates, instead, in a high orbit (MEO or GEO) 3. This is the case, for instance, of satellites with high added value, such as a telecommunications geostationary satellite, or a scientific satellite. This satellite will be de-orbited towards a parking orbit 4 instead, which is located further away than its mission orbit, and this will be done in such a manner as to avoid interfering with other satellites or spacecraft.

A first embodiment of the device 10 according to the present invention is described below with reference to the above-mentioned FIG. 2.

The device 10 comprises a container housing 110, preferably cylindrical shaped and made of a metallic or composite material. The metallic materials used for this purpose are preferably aluminium or steel, but other metallic materials may also be suitable. The housing 110 is preferably made in three portions consisting of a convex or semispherical head portion 112, a cylindrical central portion 114, and a flat terminal portion 116, that may also be made in a convex shape. The portions may be made separately by milling, turning and/or shear spinning processes, then joined together, preferably by means of welding, e.g. circumferential laser weldings or electronic beam weldings. It is equally possible to join the three portions together by means of mechanical joints, such as bolted flanges, screw joints or adhesive joints, or any other coupling method. If the propellant charge for the propulsion means is glued to the housing 110, the propellant poured into the central portion 114 solidifies, thereby joining the head portion 112 and the terminal portion 116 to the central portion 114, as explained below. The tightness of the various segments is preferably ensured by means of the same welding joints or with the aid of elastomeric linings. Alternatively, the head portion and the central portion may be made in the form of a single spherical container (not shown). The use of composite materials enables a lighter-weight housing 110 to be prepared, but these materials have a shorter working life under vacuum conditions and in Space in general, due to radiation for instance, so they have to be protected.

Figure 21:
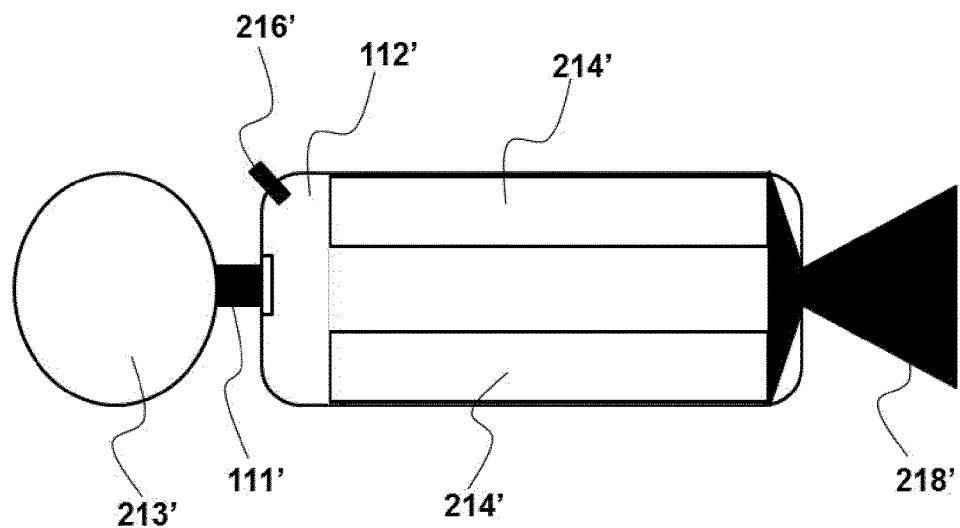
FIG. 21 shows an hybrid propulsion engine.

The device 10 also comprises propulsion means in the form of one or more solid propellant engines, each preferably equipped with one or more independent cartridges provided with solid propellant. These engines comprise at least one suitably-shaped charge of solid propellant 212, at least one combustion chamber 214, and at least one igniter 216, for said solid propellant. These propulsion means also comprise at least one exhaust nozzle 218, for discharging the combustion gases, preferably installed so as to face in the opposite direction to the orbital velocity vector. The above-described components of the propulsion means are enclosed in a generally cylindrical container, which also contains the charge of propellant 212, separated therefrom by a layer of liner, as explained in more detail below. In the embodiment described, said container coincides with the housing 110 for the device itself. Alternatively, the propulsion means of the device can be in the form of one or more hybrid propulsion means as shown in FIG. 21.

The hybrid propulsion means comprise a rocket engine that uses mixtures of propellant in different forms, such as solid and gaseous form, solid and liquid form or solid and gel form. The engine comprises a case 213' containing the gaseous or liquid or gel propellant connected with a separated combustion chamber 214' containing the solid propellant and provided with an igniter 216'. The connection between the case 213' and the combustion chamber 214' is made by one or more valves 111' controlling the flow of the propellant from the injector 112' of the case 213' to the combustion chamber 214'. Furthermore, the engine comprises an exhaust nozzle 218', convergent-divergent shaped, for discharging the combustion gases, preferably installed so as to face in the opposite direction to the orbital velocity vector, converting said hot gases in thrust. The case 213' for non-solid propellant may be pressurised to facilitate the flow movement.

Compared to the solid propellant engine, the hybrid engine has superior performance, is safer because the fuel and the oxidiser are stored in different cases and it may be re-ignited after the stop for more times, thus modulating the thrust. With this engine the device shall minimize the thrust misalignment or the trajectory errors by effecting one or more orbital manoeuvres.

Figure 22:
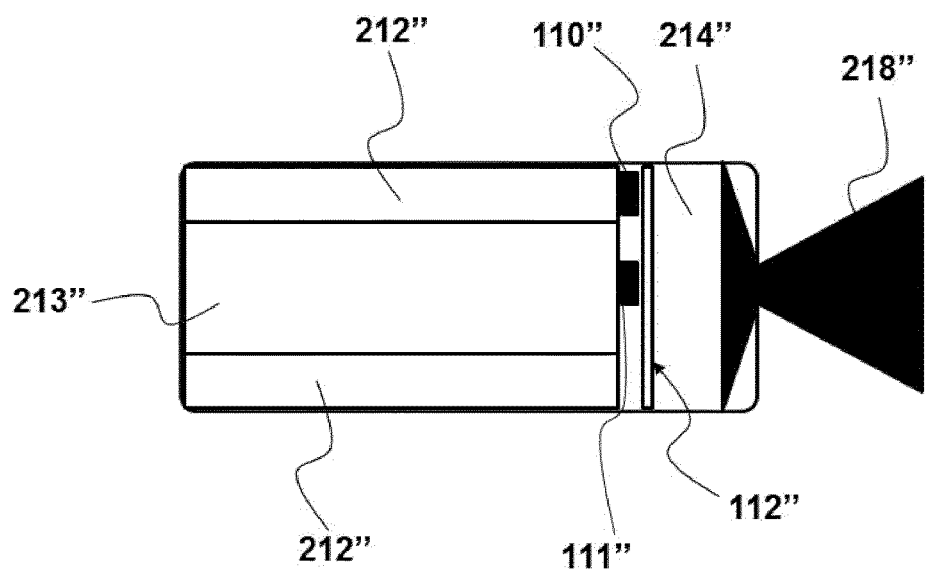
FIG. 22 shows a gel propellant engine.

Alternatively, the propulsion means of the device can be in the form of one or more gel propellant propulsion means, as shown in FIG. 22.

The gel propellant propulsion means comprise a rocket engine that uses a liquid bi-propellant in which the fuel and the oxidiser are gelled. The engine comprises a first case 212" containing the gelled fuel and a second case 213" containing the gelled oxidiser. As shown in FIG. 22, the second case 213" is housed in a central portion of the device and the first case 212" surrounds the second case 213". It is also possible to store fuel and oxidiser together as a gelled mixture in a single case. The engine comprises a separated combustion chamber 214" connected with the cases 212", 213" by one or more valves 110", 111" controlling the flow of the gel propellant from the injector 112" of the cases 212", 213" to the combustion chamber 214". Furthermore, the engine comprises a convergent-divergent shaped exhaust nozzle 218" for discharging the combustion gases, preferably installed so as to face in the opposite direction to the orbital velocity vector, converting said hot gases in thrust. The cases 212", 213" for the gel propellant may be pressurised to facilitate the flow movement.

With respect to the solid propellant engine, the hybrid engine may be re-ignited after the stop for more times, thereby modulating the thrust. With this engine the device shall minimize the thrust misalignment or the trajectory errors by effecting one or more orbital manoeuvres.

The device may further comprises safety ignition means operatively connected with the on-board control means to receive the ignition control signal and to operate the ignition of the propulsion means. In particular, said safety ignition means can be part of the propulsion means as safety and ignition unit (SIU) integrated in the igniter.

In this embodiment, the igniter 216, and consequently any safety and ignition unit, are operatively connected with the on-board control means described later, to receive the ignition signal. Said signals may be in an encrypted mode to secure the transmission and prevent the anti-intrusion and unauthorized ignition. The igniter 216 contains a charge of energetic material inside a container of suitable shape (preferably cylindrical). In this embodiment, which comprises a solid propellant propulsion mean, this container has an opening in the direction of the principal charge of solid propellant. In the embodiment described herein, the igniter 216 is inserted in a cylindrical hole in the charge of propellant 212. When the igniter 216 is enabled, this opening enables the products of combustion to make contact with, and consequently ignite, the principal charge of propellant 212. The opening is preferably round, sealed by means of a normal metal foil, and designed to explode as soon as the igniter 216 has been enabled. The charge inside the igniter 216 may consist of different types of known mixtures for generating hot gases and a large number of particles of incandescent metallic oxide, which in turn can ignite the principal charge of solid propellant 212 when they come to bear on the latter. Mixtures of boron-potassium nitrate or potassium nitrate, or pyrotechnical charges generally, may be used, with the optional addition of a charge of conventional solid propellant as a backup charge. This charge may be cylindrical with a central perforation, or simply a cylindrical piece of propellant, or it may consist of a plurality of small pieces of propellant so that their resulting greater surface area of combustion reduces the igniter's total combustion time. If the igniter 216 only contains a pyrotechnical mixture, this is all contained inside the igniter. If, on the other hand, there is also a backup charge, this charge and the pyrotechnical mixture are kept separate inside the igniter 216 by a thin membrane. This membrane is ruptured when the pyrotechnical mixture is ignited, prompting the ignition of the backup charge and the rupture of the foil covering the opening of the igniter 216. This releases the products of combustion from the igniter 216 towards the principal charge of propellant 212. The pyrotechnical mixture may be in grains or small pastilles, depending on the dimensions of the device 10. The container for the igniter 216 is aligned with the axis of the principal charge and designed so that it cannot explode when the igniter 216 is enabled.

The igniter is preferably coupled with the head portion 112 of the housing 110 by means of a joint, such as a screw connection, which is sealed by means of an elastomeric O-ring type lining, or with the aid of an adhesive for instance. Alternatively, the igniter 216 according to the above description may also be inserted directly in the central hole in the charge 212.

The safety and ignition unit (not shown) is enabled by electrical signals generated by the on-board control means with which it is operatively connected, and it is used to enable the igniter 216. The SIU unit may include an in-line high-voltage igniter, an off-line low-voltage igniter, or an in-line low-voltage igniter. In the SIU fitted with a high-voltage in-line igniter, the impulse for ignition is transmitted directly to the charge of the igniter 216 by means of an exploding foil initiator or slapper detonator integrated in or positioned near the pyrotechnical charge in the igniter 216. These mechanisms are well known in the literature. The unit with an off-line low-voltage igniter consists of an electrical cable immersed in a small amount of pyrotechnical mixture identical or similar to that of the igniter 216. This mixture is encapsulated and sealed. The igniter is made immune to any electromagnetic interferences by means of an electrical filter. The electronics of the igniter may also include an integrated test circuit for testing the state of the exploding foil initiator or low-voltage igniters. Alternatively, a state of unintentional arming may be detected by the off-line low voltage version if the piston it contains moves and consequently changes the state of a circuit, e.g. by breaking an end-of-stroke disk, or by pressing a button. The SIU can be made even safer by adding one or more transistors. In particular, the arming and ignition signals sent by the on-board control means are really transmitted to the active components of the igniter 216 (the electrical charge of the capacitor or the exploding foil initiator, or the low-voltage igniter) only if the transistors are enabled by separate signals generated by electrically uncoupled and totally independent electronic boards.

As described previously, the propellant charge 212 in the first embodiment (shown in FIG. 2) is preferably attached to the housing 110. Alternatively, the propulsion means comprise one or more independent cartridges provided with solid propellant. Said separate cartridges are preferably again attached to the housing 110. Said propellant charge 212 may also be divided into two separate segments by a membrane so as to deliver a double impulse. The gases generated by the first charge are therefore released directly through the nozzle 218, while the gases generated by the second charge reach the nozzle 218 through a duct (not shown), which is protected with a layer of ablative material, such as a silica-reinforced phenolic resin. The combustion volumes of the two charges are separated by a membrane that prevents their simultaneous ignition. The second charge is therefore ignited by an additional igniter (not shown). The formulation of the solid propellant and the shape of the grain must have such characteristics as to guarantee that it fills the available volume and maximises the specific impulse, while being scarcely sensitive to pressure at the same time. In particular, the shape of the charge and the formulation of the propellant used must maximise its performance and minimise its mass and volume, while meeting the necessary reliability requirements. The solid propellant charge 212 may also have regressive combustion features, consuming the majority of the propellant immediately after ignition and as little as possible afterwards. The rate of combustion must be as high as possible, subject to the maximum thrust demands deriving from the structural requirements of the satellite 20', 20" and of the mechanical coupling interface between the device 10 and the satellite 20', 20", described later on. If the charge is inserted in a cartridge, the propellant is poured into a rubber container that is in turn attached to the housing 110. If the propellant is poured directly into the housing 110, as described for the first embodiment in FIG. 2, then the charge of propellant 212 is attached to the housing 110 by means of a layer of liner, i.e. an elastomer that can be made from the same binder as the propellant 212 and contain a filler, such as carbon black. The liner is bonded to the propellant charge 212 by means of an excess of reticulating agent and a coupling agent. The length-to-diameter ratio of the propellant charge 212 is usually very small to minimise the total length of the device 10.

The products of combustion are released through an exhaust nozzle 218, which is an integral part of the housing 110, in order to obtain the necessary thrust, as explained previously. In the first embodiment illustrated in FIG. 2, this nozzle has a convergent-divergent shape and is made of a metallic or ceramic material, depending on the material used to make the housing 110 to which it is attached. The nozzle 218 may be at least partially embedded in the housing 110 to reduce the dimensions of the device 10. A nozzle made of a metallic material (e.g. aluminium, steel or the like) may be protected from the hot gases generated by the combustion process by means of a suitable layer of ablative material, such as silica-reinforced phenolic resin or other already known compositions. Such protection may be unnecessary if the combustion time is limited. A ceramic nozzle can be made of a monolithic ceramic material, or a ceramic material reinforced with a composite material containing long or short fibres. It is preferably made of a "carbon-carbon" (carbon fibres in a carbonic matrix) or a C—SiC (carbon fibres in a silicon carbide matrix), or even a C—C/SiC (carbon-carbon/silicon carbide) ceramic material. The diameter of the passage in the nozzle 218 is wide enough to generate a strong thrust and to expel a considerable flow of gas, minimising the total combustion time. In the first embodiment, the nozzle 218 is attached to the terminal portion 116 of the housing 110 by means of bolts 218', 218''. Alternatively, the nozzle 218 may be placed inside an ad hoc container, which is screwed or attached in some way to the housing of the propulsion means 110. Or it may be attached directly to the housing 110, or installed by means of a flange integrated in the shape of the nozzle 218. In said embodiment, the convergent-divergent nozzle 218 is connected with the housing 110 that serves as a combustion chamber.

The nozzle 218 is also complete with an environmental seal (not shown), consisting of a membrane that covers the nozzle, separating the solid propellant charge 212 from the outside environment. This avoids any contamination of the solid propellant in transit from the production site to the launching site by humidity, or any loss of volatile species such as the plasticiser of the propellant. The membrane is preferably made of metal or plastic and welded to a metal ring with a screw or glued thereon. The ring is sealed by means of an elastomeric lining, such as an O-ring, or welded or glued to the nozzle 218. The seal has a thermal protection layer to avoid any excessive transfer of thermal energy between the outside environment and the inside of the device 10. The membrane is preferably engraved with a cross-shaped motif so that it can open when the device 10 is ignited. This enables the opening of the membrane in four equal-sized sections while it remains nonetheless coupled with the ring, and consequently with the nozzle 218, thereby avoiding any further contamination of Space with additional debris. Alternatively, the membrane may be weakened in the vicinity of the circumference of the ring and attached by means of a chain or wire to the outer part of the nozzle 218. In both cases, the risk of parts of the environmental seal being released into Space is avoided or minimised, thereby preventing further orbital pollution.

The propulsion means are operatively connected with the on-board control means (not shown in the Figures) serving the device 10, preferably comprising electronic controllers designed to be immune to electromagnetic interferences or radiation occurring in Space. In the embodiment described herein, the on-board control means specifically consist of an electronic board fitted with microcontrollers and an electronic and/or electrical interface for connection with the further means comprising the device 10 operatively connected thereto. In particular, the on-board control means send instructions to and/or receive information from said means in the device 10. These on-board control means also allow the device 10 to be independent from the satellite 20', 20" to be de-orbited/re-orbited. Another function of the on-board control means in the present embodiment is to manage and process controls and signals exchanged with a receiving-transmitting device at a station on Earth or on other space vehicles. Being associated with the propulsion means, the on-board control means effect the arming and ignition of the device 10, thus enabling the activation of the SIU and consequently also the propulsion means or, more specifically, the igniter 216.

A further purpose of the on-board control means is to send data concerning the state of operation of the device 10 and/or of the satellite 20', 20" to Earth or to another space vehicle, or to the satellite 20', 20" with which the device 10 is coupled, by a telecommunications unit, having recorded said data by appropriate sensors, as explained in detail below.

The means for receiving control signals (not shown) comprise one or more low-gain or high-gain antennas and an electrical and/or electronic interface between the antennas and the on-board control means with which they are operatively connected. These means for receiving control signals are preferably part of the telecommunication means (not shown) operatively connected with the on-board control means. In particular, in said embodiment the telecommunication means also comprise further means for transmitting data, including at least one transmitter antenna for sending signals and suitable apparatus for receiving them. The resulting communications are preferably exchanged directly with a receiver station on Earth or with another vehicle located in Space, using a suitable communication bandwidth. This communication enables the state of the device 10 and/or of the associated satellite 20', 20" to be verified, as explained below. The communication channel also enables confirmatory signals to be sent, relating to the effective arming or ignition of the device, for instance. The signals sent to and from the telecommunication means, be it from Earth or from Space, have transmission characteristics designed to minimise their mass and volume. The telecommunication means are also designed to be immune to electromagnetic interference and radiation existing in Space.

The electric power supply means (not shown) for the device 10 preferably comprise one or more rechargeable or non-rechargeable, primary batteries connected together so as to provide enough power to ignite the device 10 when necessary. The power delivered must also be able to sustain the other components of the device 10 throughout its working life. If the batteries are of the rechargeable type, they can be recharged directly by the satellite 20', 20" with which the device 10 is connected, providing there is an electrical connection between the two. In the preferred embodiment, these batteries can be recharged using any form of power generation suitable for operation in Space, such as the photovoltaic technology. They may also be recharged by exploiting the magnetic field of a planet, or an energy harvesting device relying, for instance, on the temperature difference between two points on the device 10 (e.g. between a point exposed to the sun and one in the shade). These electric power supply means are also designed to be immune to electromagnetic interferences and radiation existing in Space. The electric power supply means are operatively connected with, and controlled by the on-board control means, to which they also deliver a power supply.

The mechanically coupling means 310 couple said device 10 to the satellite 20', 20" before it is launched. In this embodiment said coupling to the satellite is achieved by means of a mechanical interface platform. This mechanical coupling is completed before launch, namely before the satellite is in service. The mechanical coupling means 310 thus enable the simultaneous displacement of the satellite 20', 20" and of the device 10, when the latter is activated for the purpose of de-orbiting/re-orbiting the device-satellite system.

Figure 2:
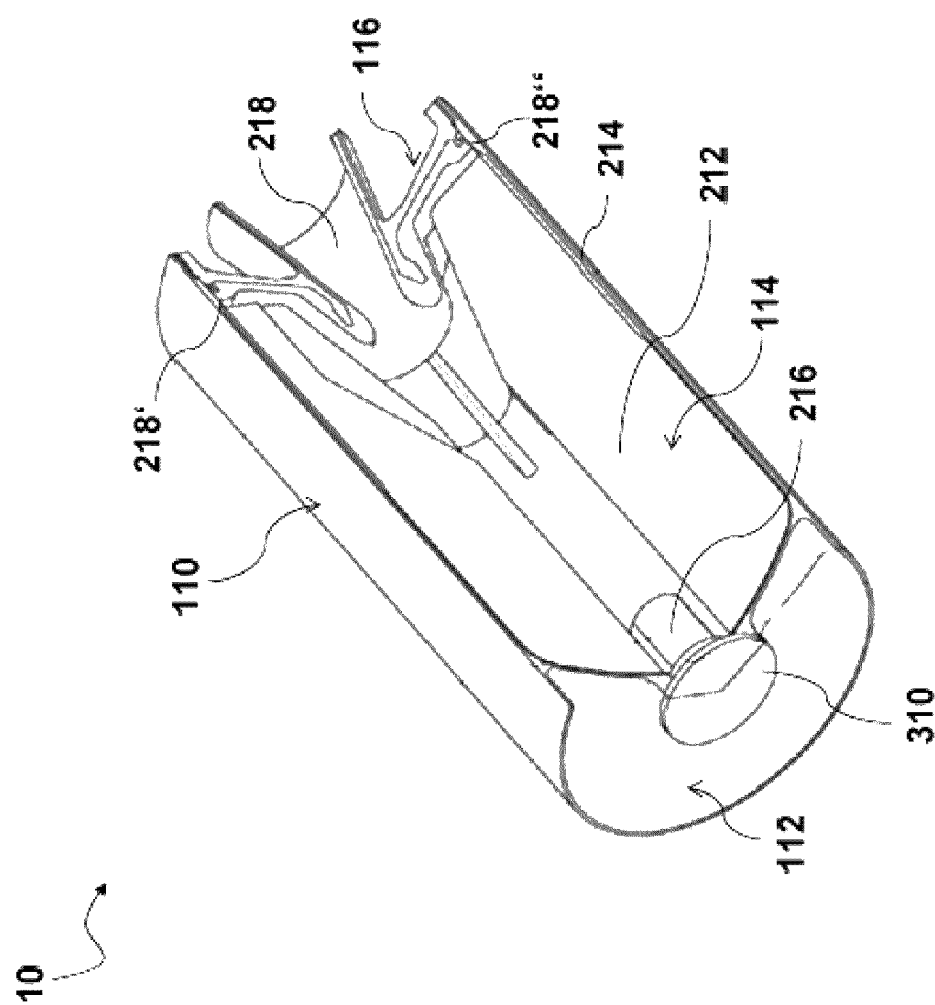
FIG. 2 is a schematic cross-sectional view of a first embodiment of the device according to the present invention.

In the first embodiment shown in FIG. 2, the mechanical coupling means 310 comprise a single fixed joint between the device 10 and the satellite 20', 20", positioned centrally with respect to the head portion 112 of the device 10.

The device 10 is also equipped with thermal protection means. In the embodiment described, these include a passive thermal insulation to limit the changes in temperature in the most crucial components of the device 10 and to ensure low temperature gradients. This is because a high temperature, for instance, accelerates the chemical ageing of the propellant and linings. Low-temperature thermal cycles, on the other hand, cause stress and strain in the propellant, negatively influencing the volume it occupies and consequently also its performance. Limiting the minimum temperature that the charge of propellant may reach in orbit thus leads to an improvement in its performance. For the propellant, the minimum allowable temperature approximately coincides with its glass transition temperature (for hydroxy-terminated polybutadiene [HTPB] propellants, the minimum temperature should not drop to below −60° or −80° C., depending on the rate of cooling). The maximum allowable temperature is the one at which the propellant begins to deteriorate chemically too rapidly or even to ignite (the maximum temperatures should not exceed 70° C. or 80° C.). The other components that also require thermal insulation are the electronic units and the elements comprising the electric power supply means. A thermal insulation system preferably consists of multilayer insulators (MLI), i.e. layers of insulating material contained inside a metal foil, special coloured paints, or other passive or active systems. Passive thermal insulation is fundamental to ensuring an even temperature in the propellant charge and any small, auxiliary, non-reusable rockets, as described later on. Even more preferably, the insulation can be made by inserting a layer of highly conductive material under several insulating layers.

In the present embodiment, further active thermal insulation is preferably used to protect the electronics of the device 10 and its electric power supply means when the temperature differences in these components are not adequately controlled by the passive insulation. Alternatively, it would be possible to use such an active system alone if the passive system becomes unnecessary for the thermal protection of the components of the device 10. Additionally, if the satellite 20', 20" is equipped with thermal protection, it becomes possible to implement actions and synergies with the device 10 to contain the temperature changes in the latter.

During the assembly of the device 10 on the satellite 20', 20", small errors may occur in the alignment of the thrust vector in relation to the principal axes of inertia that pass through the device-satellite system's centre of mass. The system's centre of gravity may also vary uncontrollably during the working life of the satellite 20', 20" (e.g. due to a malfunction in the latter), giving rise to an excessively large thrust vector alignment error for the efficient operation of the device 10. To prevent this situation, the device is equipped with means to mitigate the misalignment of the thrust vector, operatively connected with the on-board control means. In particular, said means to mitigate the misalignment may comprise means for active and/or passive control of the thrust vector which effect the alignment of the thrust vector, as described below in a further embodiment.

The device may further comprises means for detection and/or control of the attitude of the satellite with which is coupled, operatively connected with the means to mitigate the misalignment. Furthermore, said means for detection and/or control the attitude of the satellite are operatively connected with the on-board control means and effect the directional control of the device and of the satellite when the propulsion means are activated.

Means for active and/or passive control of the thrust vector effect an adjustable and/or a mobile connection between the satellite and the device are used in the embodiment described below. In this embodiment a passively or actively adjustable mechanical interface effects the alignment of the thrust vector.

Figure 3:
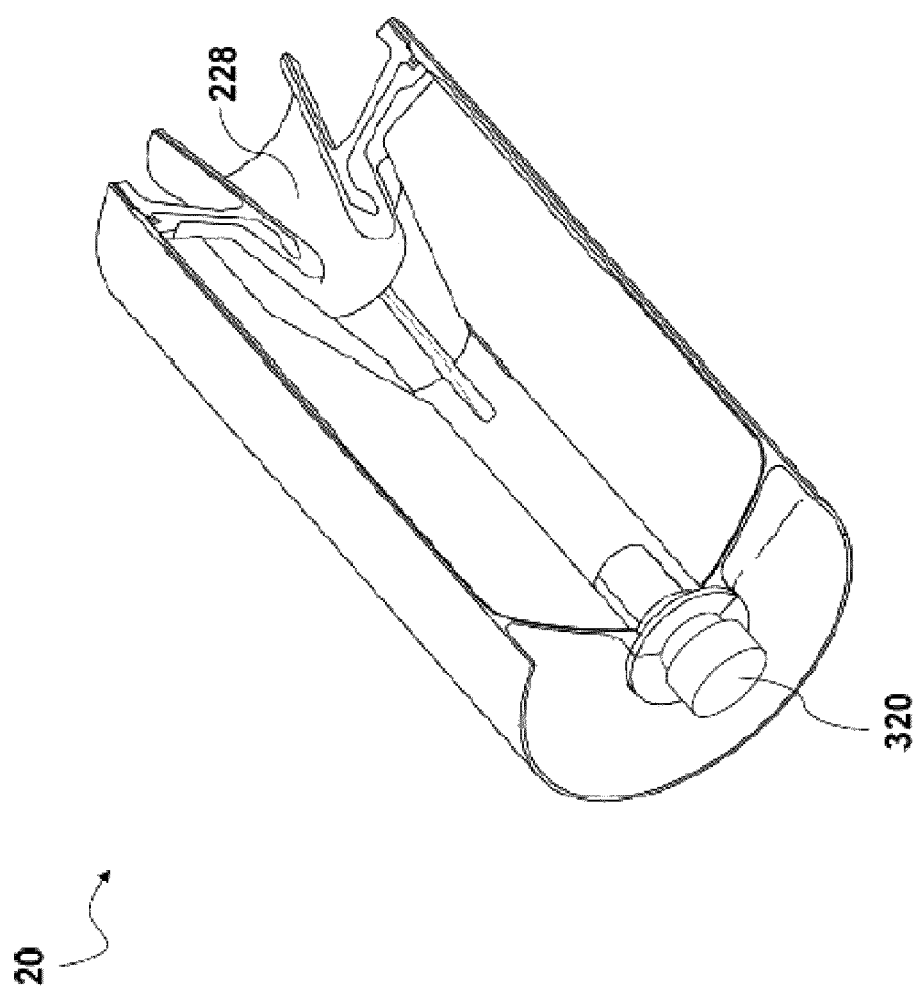
FIG. 3 is a schematic cross-sectional view of a second embodiment of the device according to the invention comprising adjustable mechanical coupling means.

In the second embodiment, shown in FIG. 3, the device 20 is as described above for the first embodiment, but also comprises adjustable means 320 for mechanical coupling with the satellite 20', 20". These mechanical coupling means 320 effect an adjustable and/or mobile connection between the satellite 20', 20" and the device 20. This enables an adjustment of the orientation of the device 20, during the assembly and/or the passive control of the system, to align the thrust direction with that of the centre of mass of the satellite 20', 20", possibly with a locking action on completion of said alignment.

Figure 4:
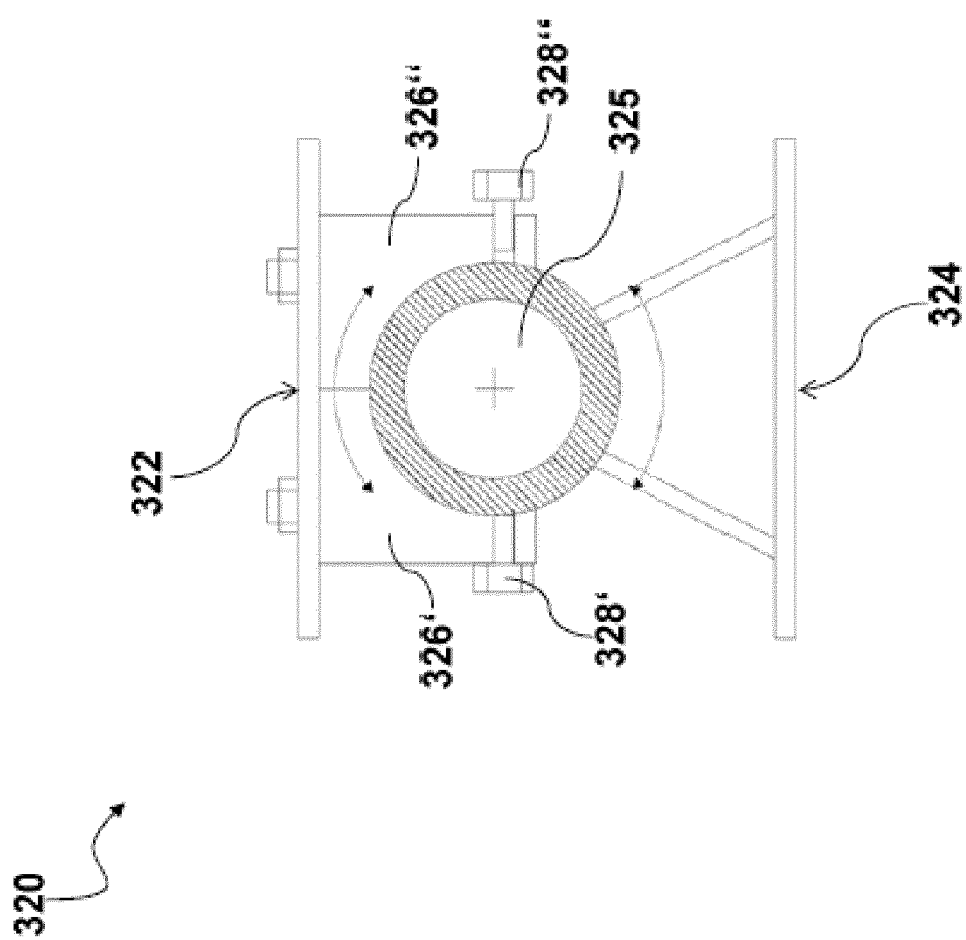
FIG. 4 is a schematic cross-sectional view of the adjustable mechanical coupling means of the device in FIG. 3.

The adjustable mechanical coupling means 320 according to the description given for the embodiment of the device 20 in FIG. 3, are illustrated in more detail in FIG. 4. They are achieved with a passive adjustable mechanical interface comprising a first portion 322 in contact with the device 20, and a second portion 324 in contact with the satellite 20', 20". The adjustable mechanical coupling means 320 also comprise a spherical joint wherein two flanges 326', 326", with a semi-spherical concavity in one side and a fixed, flat interface in the other (in contact with the first portion), contain a hollow sphere 325. The device 20 can thus rotate in relation to the central axis of the satellite 20', 20" by means of the relative movement of the first portion 322 on the sphere 325. A precision adjustment is obtained by rotating the spherical joint after it has been installed in the flanges 326', 326". To reduce the error of the thrust vector to nil, the device can be rotated until the axis of the nozzle 228 in the propulsion means passes through the centre of gravity of the device-satellite system. The joint is then locked in the required position by means of a suitable number of bolts 328', 328". If the sphere 325 is made of a softer material than the bolts 328', 328", then the bolts are screwed into position until they perforate the sphere, thereby locking it in place. Otherwise, fitting a sufficient number of bolts or large screw studs would interfere with the rotation of the sphere 325, due to friction for instance. An alternative solution is to use a sphere of magnetic material inserted in a cavity of non-magnetic material. Screwing the magnetic poles down until they come close enough to the sphere would enable the magnetic force to prevent its rotation. To avoid any loosening of the bolts or screws, the material chosen must not be liable to strain as a result of the temperature differences occurring when the satellite is launched or in orbit. The screws are also preferably locked with the aid of a thread-locking adhesive.

Another embodiment (not shown) involves the nozzle 218 being connected with the housing 110 by means of a flexible joint. This solution is useful in special applications, such as satellites operating in a geostationary orbit. When this solution is adopted, if the interface for the mechanical coupling (described later on) is adjustable, it may be simplified, requiring adjustment only before the satellite is launched, during the assembly stage. The adoption of this last coupling solution with a flexible joint makes it unnecessary to adopt a system for mitigating any misalignment of the thrust vector, such as the one described in more detail later on.

In some cases, however, an active control over the alignment of the thrust vector by means of the adjustable interface may be the best way to fully exploit the potential of the present invention. This active system is particularly effective in cases in which the centre of gravity of the satellite 20', 20" changes during its mission and it is impossible to calculate its position in advance, before enabling the device 10 (due, for instance, to a malfunction of the satellite 20', 20"). The active alignment control is likewise useful in cases in which a small satellite 20', 20", with relatively small moments of inertia, pitching and yawing, lacks a system for mitigating any thrust misalignment (described below), and the device 10 takes a relatively long time to produce the impulse needed. An active method for adjusting the thrust direction, and the related active mobile mechanical coupling means, may use hydraulic, electric or gas-powered pistons located between the second portion 324 and the flanges 326', 326". The adjustment depends on the position of the pistons and can be controlled with ease by means of an inertial platform and a standard proportional control system. One piston is needed to control one axis, two pistons for two axes and so on, i.e. the number of pistons increases the more the axes to be controlled.

Figure 5:
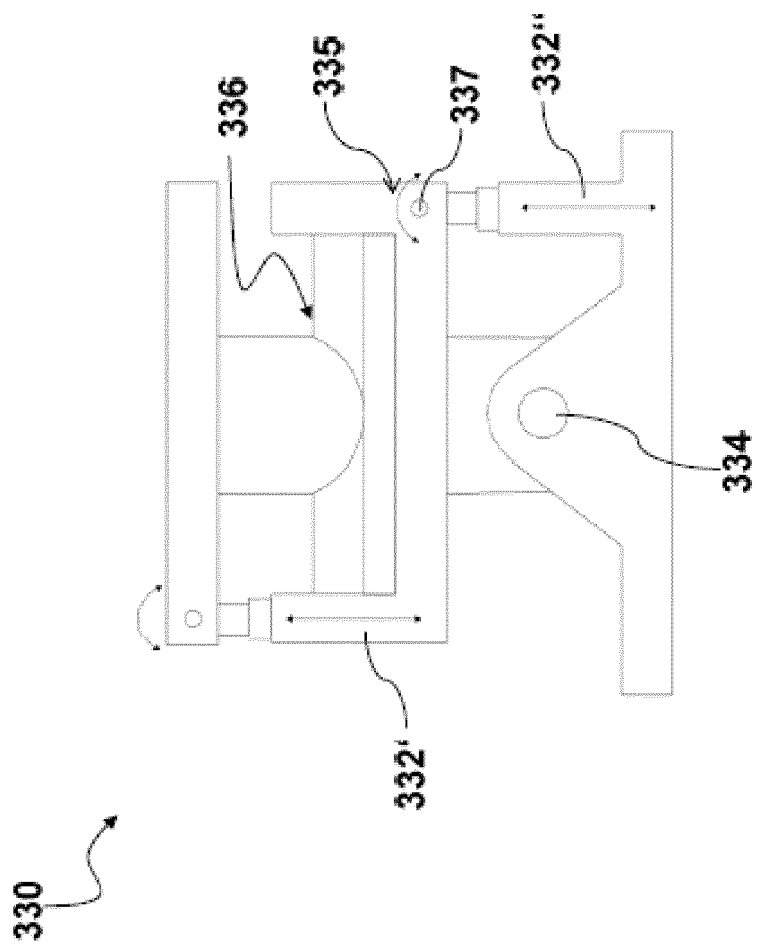
FIG. 5 is a schematic view of a version of active control for the adjustable mechanical interface according to another embodiment of the device according to the present invention.

A version of active control for the adjustable mechanical interface 330 is represented in a further embodiment in FIG. 5. The position relative to the angle of rotation around an axis, such as the pitching axis, is controlled by means of a pair of hinged cylinders 332', 332" coming to bear off-centre with respect to the main hinge 334. When the main hinge for controlling the second axis 336 is locked and the cylinders 332', 332" are operated, this generates a rotation 335 of the second portion 324 of the movable coupling means 330 and consequently of the satellite 20', 20" coupled thereto. This enables the mutual rotation of the device and satellite around a first axis, e.g. the pitching axis. A hinge 337 in the joint (consisting of a bar inside a hole, for instance) prevents any bending moment. The control over the position, for instance, of the angle of rotation in relation to the other (e.g. yawing) axis is identical to the one just described and is exerted by means of an identical mechanism located below or above the pitching control, rotated through 90°. A more compact version (not shown) of the mobile mechanical coupling means can be made using a cross-shaped element. This element comprises two bars separated from one another and joined at their centre by means of a cylindrical element. This cylindrical element may be milled or made from turned cylindrical bars that are then screwed, welded or glued together. The upper bar enables the rotation of the flange facing the satellite while the lower bar enables the rotation of the flanges in contact with the device.

Figure 6:
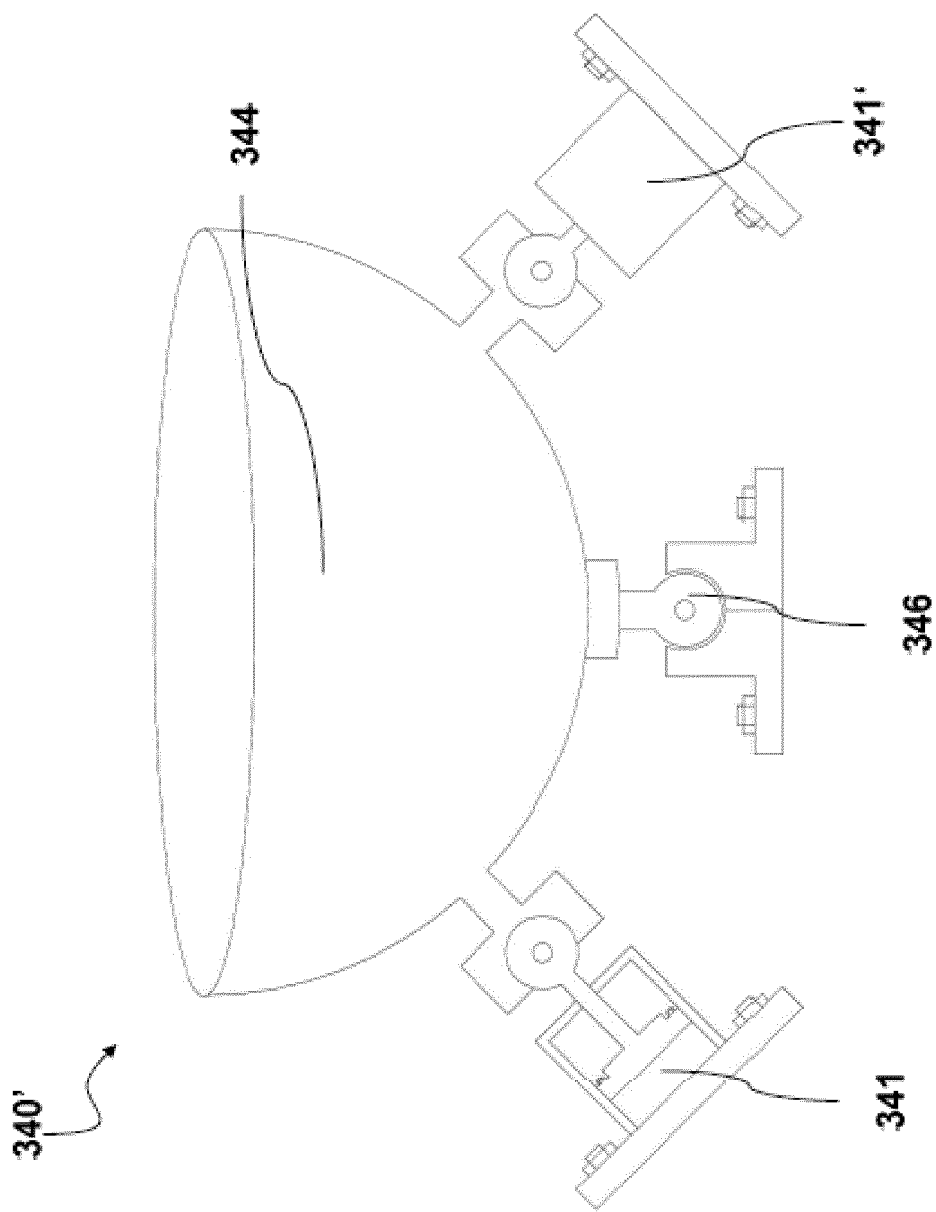
FIG. 6 is a schematic view of a version of active control for the adjustable mechanical interface according to another embodiment of the device according to the present invention.
Figure 7:
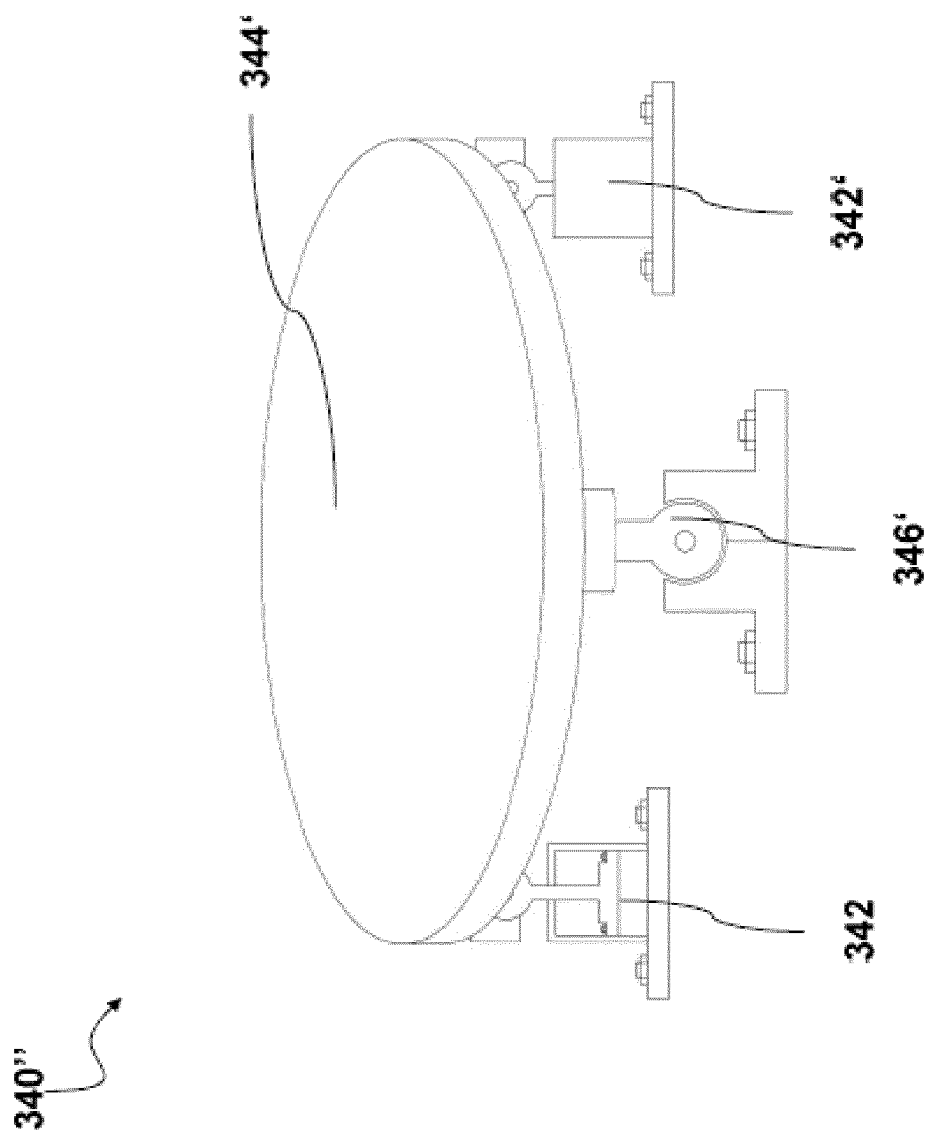
FIG. 7 is a schematic view of a version of active control for the adjustable mechanical interface according to another embodiment of the device according to the present invention.

Another embodiment, differing in the actively controllable adjustable mechanical coupling means 340', 340" is illustrated in FIGS. 6 and 7. Position control on pitching or rolling, or both, is achieved by means of two cylinders with a spherical joint at the top 341, 341', 342, 342', installed in line with the second portion 344', 344" in contact with the satellite 20', 20". In particular, this portion is shown with a dome shape in the embodiment in FIG. 6, and a flat shape in the embodiment in FIG. 7, but it may also be of any other shape. In this embodiment, the second portion 344, 344' enables coupling either with the satellite 20, 20' or with the device. At the centre of said second portion 344, 344' there is a spherical joint 346, 346', which allows for rotation and does not need to be displaced axially. The above-described two cylinders 341, 341', 342, 342' and the spherical joint 346, 346' are also positioned at an angle of approximately 120° in relation to one another on the surface of the second portion 344, 344'. If one of the cylinders 341, 341', 342, 342' is moved, the surface of the second portion 344, 344' tilts in relation to an axis connecting the other cylinder to the spherical joint 346, 346'. Controlling the pistons of the two cylinders 341, 341', 342, 342' consequently enables any necessary rotation of the thrust vector. These pistons can be controlled electrically, hydraulically, or pneumatically.

Figure 8:
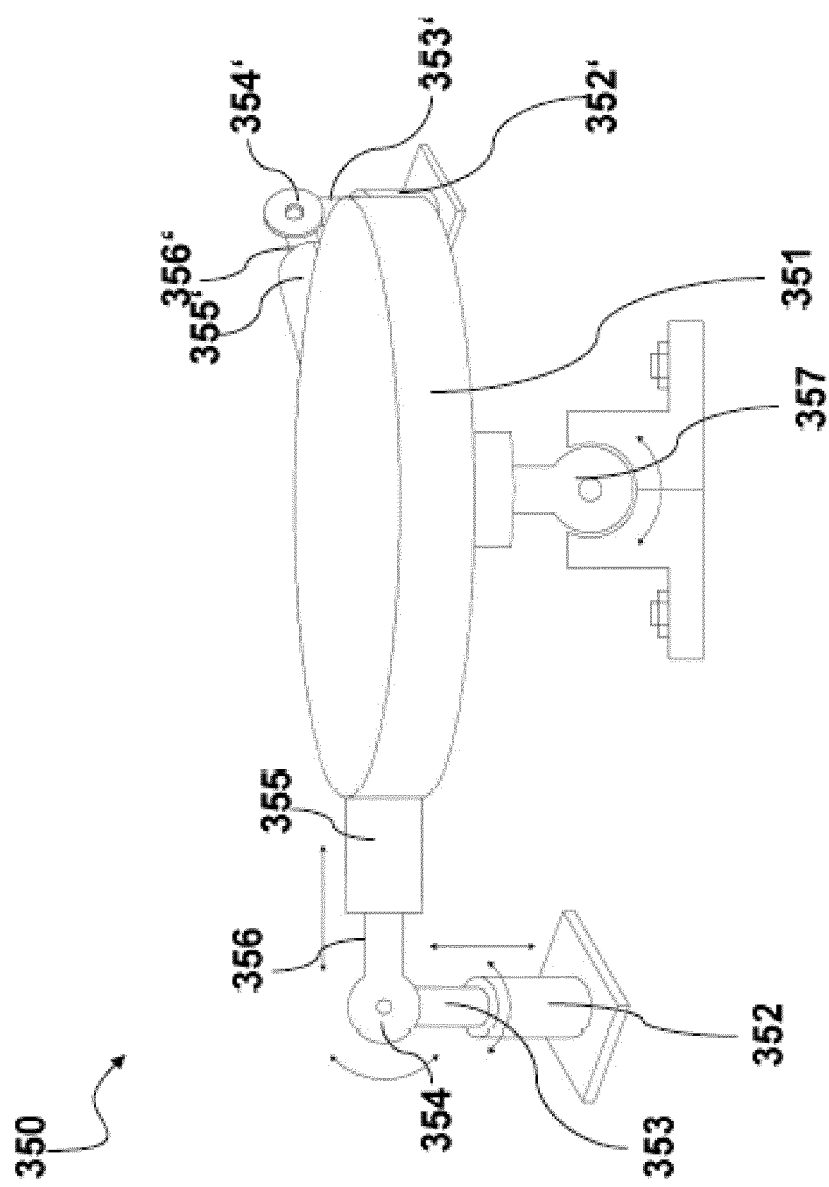
FIG. 8 is a schematic view of a version of active control for the adjustable mechanical interface according to another embodiment of the device according to the present invention.

Another embodiment of the actively controllable adjustable mechanical coupling means 350 is illustrated in FIG. 8. This embodiment, like those described previously relating to FIGS. 6 and 7, comprises two cylinders 352, 352', but they are designed differently from the previous cylinders. The base portion 351 of these adjustable mechanical coupling means 350 can be coupled either with the satellite 20', 20" or with the device according to the present invention. The means comprise first cylinders 352, 352' consisting of a first piston 353, 353' that can be operated electrically, hydraulically or pneumatically. The piston 353, 353' can rotate around its own axis and is fixed to the adjustable mechanical coupling means 350 by means of a hinge 354, 354'. A second piston 355, 355' is coupled to the hinge 354, 354' so that it can rotate in relation to the cylinder 352, 352' and therefore also in relation to the first piston 353, 353'. In the portion opposite the hinges 354, 354', said second piston 355, 355' is coupled directly with a second cylinder 356, 356' that is coupled directly with the base portion 351, and can also be controlled electrically, hydraulically or pneumatically. The base portion 351 can then rotate (axis of rotation not shown) in relation to the axis of the piston 355, 355'. If one or both of the first cylinders 352, 352' are operated, the base portion 351 can be oriented in any required direction. The base portion 351 also comprises a centrally-located spherical joint 357.

Figure 9:
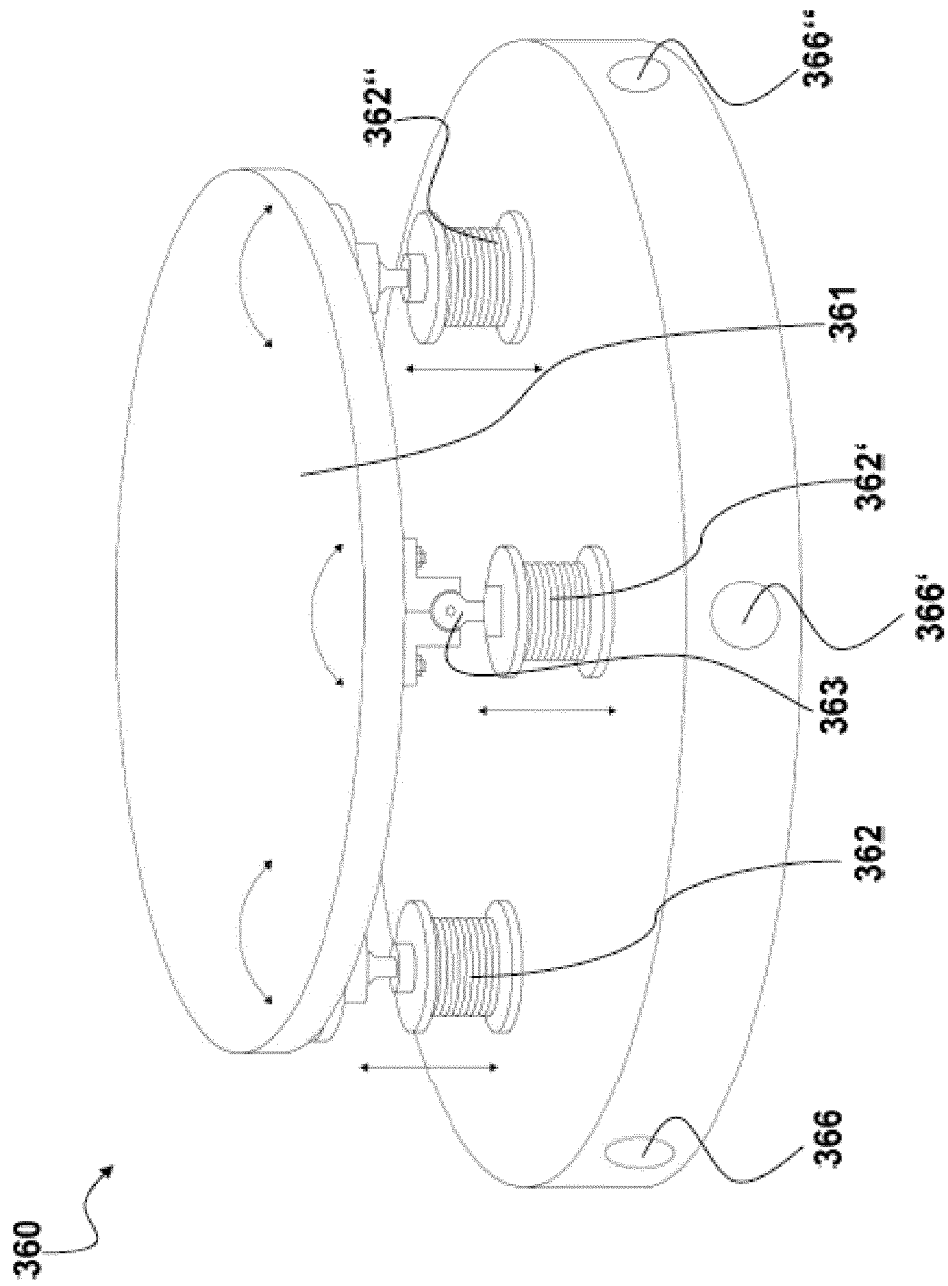
FIG. 9 is a schematic view of a version of active control for the adjustable mechanical interface according to another embodiment of the device according to the present invention.
Figure 10:
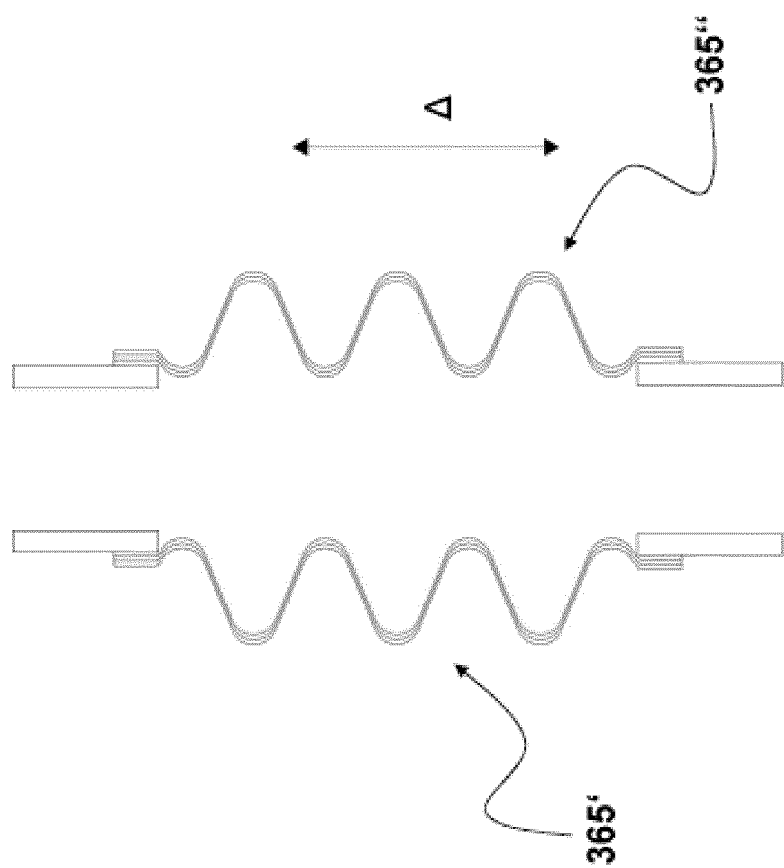
FIG. 10 is a schematic view of a detail used in the adjustable mechanical interface of FIG. 9.
Figure 11:
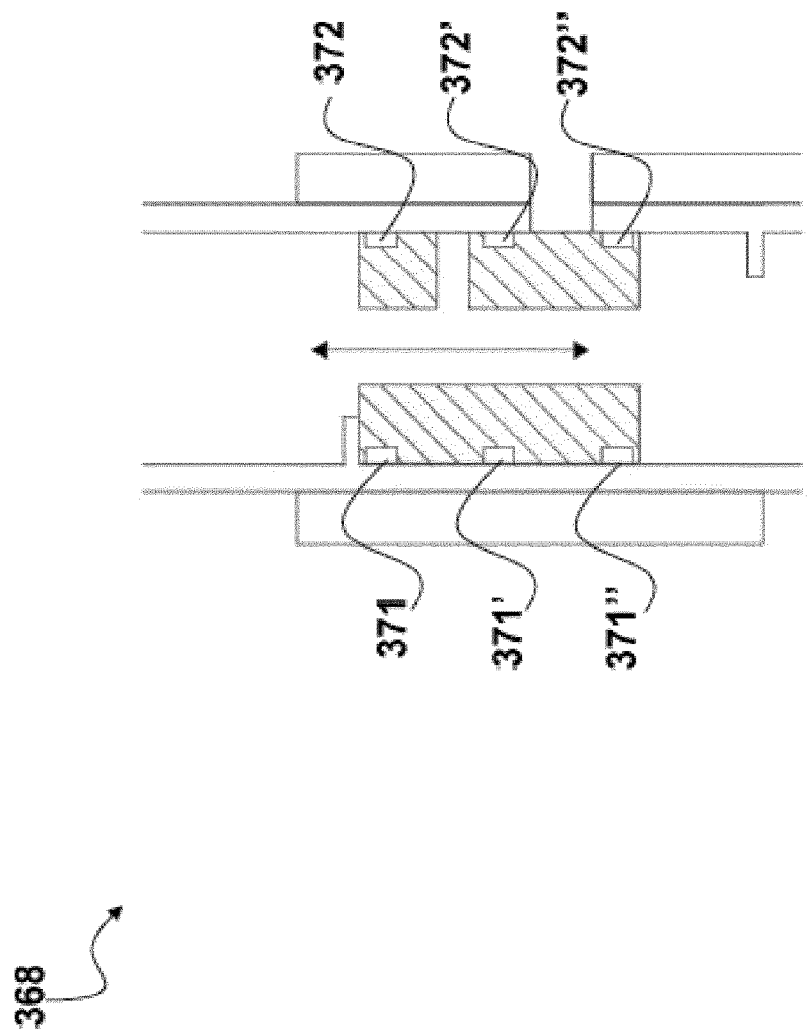
FIG. 11 is a schematic view of a valve used in the means shown in FIG. 10 when, in the closed position, it prevents any outflow of the fluid.
Figure 12:
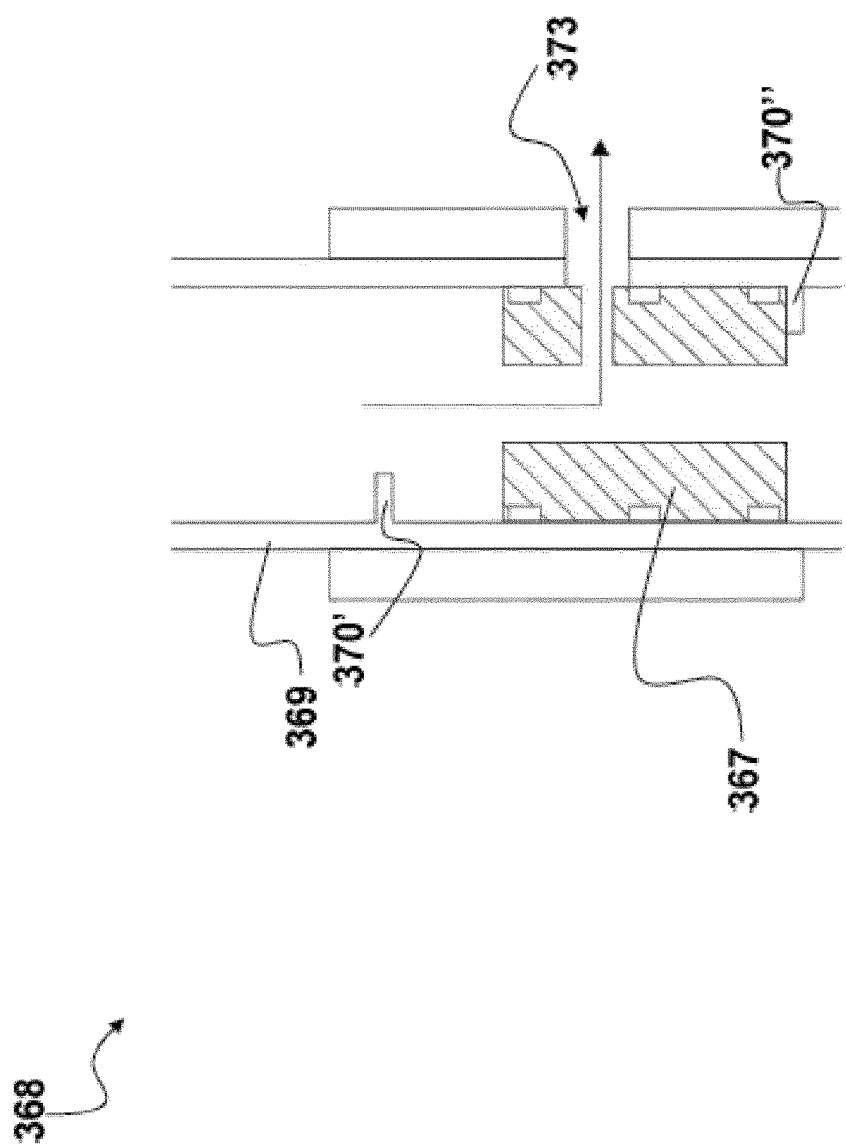
FIG. 12 is a schematic view of a valve used in the means shown in FIG. 10 when, in the open position, it enables the lateral outflow of the fluid.

The same directional control is achieved by using three or four bellows-type pistons, as in the embodiment in FIG. 9. This Figure shows actively-controllable adjustable mechanical coupling means 360 in which the pistons 362, 362', 362" are controlled electrically, hydraulically or pneumatically, e.g. by means of a pressure faucet (not shown), and preferably directly by the device's engine. Each piston 362, 362', 362" is connected with the engine by means of a three-way valve (not shown), one way being connected with the device's engine, one communicating with the piston 362, 362', 362" to be controlled, and the third being a lateral vent that is normally closed. When the engine is switched on, the pistons 362, 362', 362" come under pressure and the valve closes. To adjust the direction of the device in relation to the satellite 20', 20", orienting the thrust vector in the required direction, the third valve of one or more pistons 362, 362', 362" opens for a given time, releasing a little gas and consequently reducing the pressure in the pistons. This enables the pistons 362, 362', 362" to withdraw and the device to rotate as a consequence. As shown in FIG. 9, the three pistons 362, 362', 362" are of pneumatic type and coupled to the base portion 361, which may be in contact with the device according to the present invention, or with the satellite 20', 20". The pistons 362, 362', 362" may be positioned near the edges of the base portion 361 or in any other suitable configuration. The coupling with the interfacing base portion 361 is achieved by means of spherical joint 363 that enables a relative rotation between the axis of the pistons 362, 362', 362" and the platform. As illustrated in FIG. 10, the pistons 362, 362', 362" are governed by a gas under pressure and have a flexible conduit 365', 365" that enables them to behave like a spring, extending in the direction A of the double arrows shown in FIG. 10. Such flexible conduits 365', 365" are well known in the literature. In the present embodiment they are charged either by a separate gas generator or directly by the propulsion means of the device according to the present invention. When it is charged, the conduit 365', 365" stretches under the effect of the pressure. To control the relative position of the satellite and of the device according to the invention, it is only necessary to release a little pressure from one of the pistons 362, 362', 362" with the aid of a bypass valve 368 (in FIGS. 11 and 12). The gas can be released laterally through four vents 366, 366', 366", placed at 90° angles from one another to avoid any lateral impulses. Alternatively, the gas may be vented longitudinally in the thrust direction of the propulsion means, thereby increasing the latter's performance at the same time. This controlled gas venting is done through one of the three bypass valves 368, as shown in FIGS. 11 and 12. The venting duct is normally closed (FIG. 11), while the duct between the gas source and the flexible conduit is normally open (FIG. 11). The valve 368 comprises a piston 367 inserted in a tube 369 connecting the flexible conduit 365', 365" to the base portion 361. The stroke of the pistons 362, 362', 362" is limited by two obstacles 370', 370". The gas generator (which coincides, in the embodiment described herein, with the combustion chamber of the engine of the device according to the present invention; alternatively, it may be an external gas generator), is normally connected with the flexible conduit 365', 365". Rubber seals 371, 371', 371", 372, 372', 372" around the lateral venting ducts prevent any gas leaks. When a controlled release of gas is needed, the main tube between the gas generator and the flexible conduit 365', 365" is closed (FIG. 12) by means of a valve (not shown), such as a solenoid valve. The piston 367 then begins to move, controlled electromagnetically or hydraulically, towards the bottom limit stop identified by means of the obstacle 370", thereby uncovering the gas venting orifice 373. This enables gas to be released from the flexible conduit 365', 365" and dispelled in Space. An active directional control of this kind could demand an electronic "data recording and processing" system to enable a feedback control to be implemented, as in the well-known proportional-derivative control systems. The sensors used are preferably accelerometers for recording the angular accelerations around the two axes controlling the thrust vector. The above-described electronic components, e.g. the sensors and control system, could be the same as the attitude detection and on-board control means described later on, and/or be part of an inertial platform. These electronic components are operatively connected with the on-board control means for the device according to the invention, enabling a greater precision in the final positioning of the device-satellite system during the de-orbiting effected by said device. These means also enable a reduction of the losses due to any misalignment of the thrust vector when the propulsion means of the device according to the invention are functioning.

In a further embodiment, the means for mitigating any misalignment of the thrust vector are used if the position of the device in relation to the satellite 20', 20" to which it is coupled is fixed before launching and, by the time it is decided that the satellite 20', 20" has to be deorbited, or placed in a parking orbit, the losses of useful impulse due to thrust vector misalignment have become excessive. These losses depend on the size and mean density of the satellite 20', 20", as well as on the feasibility of obtaining a constant or variable centre of mass, as in the case of parts in motion, such as deployable solar arrays, or the consumption of propellant sufficing to modify its mass. The losses due to thrust vector misalignment are reduced a priori by designing the device so that it has a very brief combustion time, a high rate of combustion of the solid propellant, and a large diameter for the neck of the nozzle, as already explained. The mitigating means may, for instance, effect a stabilising rotation around the rolling axis with the aid of small auxiliary rockets, or using similar small, non-reusable auxiliary rockets placed off-centre with respect to the nozzle in the rear part of the device. Once ignited, these rockets generate a torque along the pitching or yawing axis, depending on their position.

Figure 13:
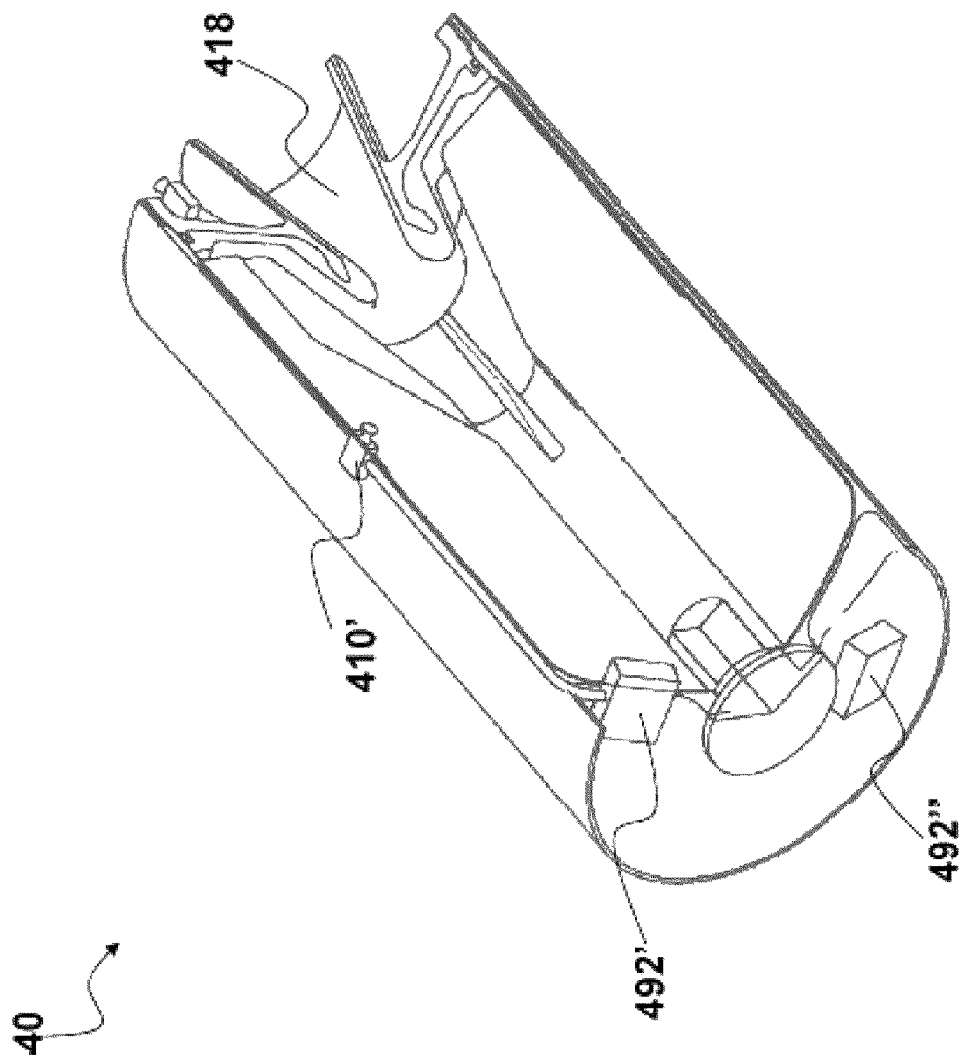
FIG. 13 is a schematic cross-sectional view of a further embodiment of the device according to the present invention, complete with means for mitigating any misalignment of the thrust vector.
Figure 14:
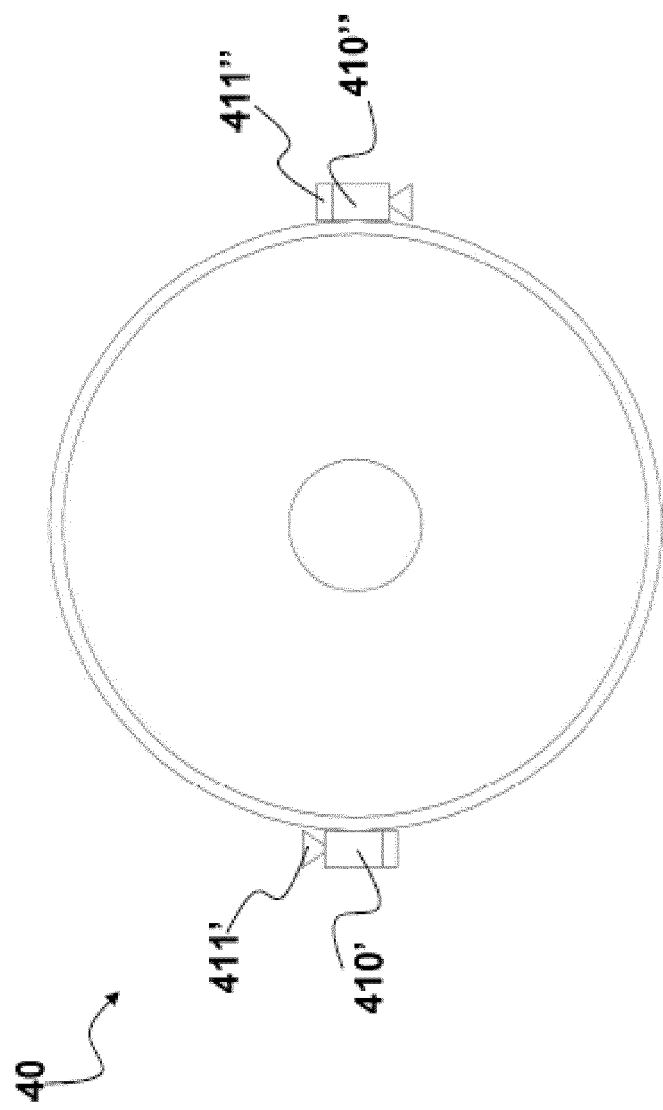
FIG. 14 is a schematic view from above of the device in FIG. 13.

FIGS. 13 and 14 illustrate an embodiment of the device according to the invention 40, complete with means for mitigating any thrust vector misalignment. This embodiment mitigates the thrust vector's misalignment by stabilising the satellite by means of a rotation around the rolling axis achievable with the aid of two small, non-reusable auxiliary rockets 410', 410' that are enabled by the SIU (not shown) on the device 40. The rockets 410', 410", are small in size and, when they are enabled, they generate a movement around the rolling axis with a rolling velocity that depends on the rockets' combustion time and thrust capacity. The rockets 410', 410" are preferably enabled before the device 40 is ignited, via a cable or radio signal sent by the SIU in the device 40. The nozzles 411', 411" of said rockets 410', 410" are positioned at a 90° angle to the direction of flight in order to produce a torque coming to bear around the rolling axis of the satellite 20', 20". When they are ignited, the rockets produce a torque that makes the device 40, and consequently also the satellite 20', 20", rotate around the rolling axis. Then the device 40 is ignited. The rotation of the satellite 20', 20" mitigates the effects of any misalignment of the thrust because the thrust component perpendicular to the direction of flight induces a precession movement. If the precession period is higher than the total operating time of the de-orbiting device 40, the net effect of the misalignment will be small. If the angular moment induced by the rotation is considerable, i.e. the angular velocity induced by the rockets 410', 410" is high enough, the angular error of the thrust's misalignment will be kept to within an acceptable level.

Figure 15:
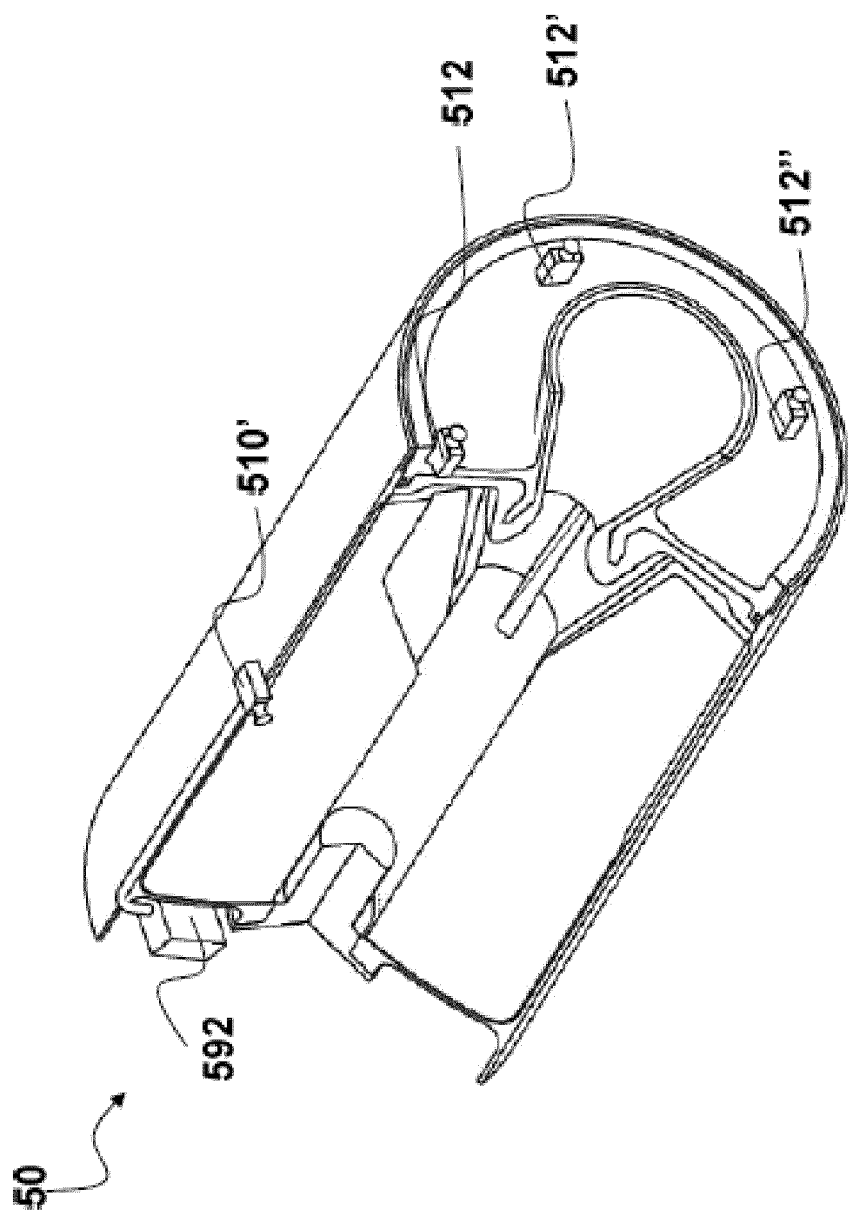
FIG. 15 is a schematic cross-sectional view of a further embodiment of the device according to the present invention, complete with means for mitigating any misalignment of the thrust vector.

Another embodiment of the means for mitigating the thrust vector misalignment is illustrated in FIG. 15. The device 50 is fitted with small, non-reusable auxiliary rockets 510' similar to the previously described rockets 410', 410". In addition, there are also the rockets 512, 512', 512", similar to the rockets 510', 510" and positioned off-centre with respect to the nozzle 518 of the device 50, i.e. behind the nozzle. When these rockets 512, 512', 512" are ignited, they generate a yawing or pitching torque, depending on their position.

The rockets described for FIGS. 13, 14 and 15 are in the form of a charge of solid propellant. In particular, they are of the non-reusable, single-impulse type fuelled with solid propellant. They may be in larger number and are preferably arranged in pairs on each axis. The previously-described rockets 410', 410", 510', 510", 512, 512', 512" are simple to manufacture and of limited dimensions, and they can be operated under the direct control of the on-board control means for the device 40, 50 according to the present invention. Being positioned far away from the axis of the nozzles 418, 518 of the device 40, 50, they produce a low level of thrust. This thrust nonetheless generates a greater torque around the pitching and yawing axes than is generated by the misalignment of the thrust. The rockets 410', 410", 510', 510", 512, 512', 512" can be attached to the outer walls of the device 40, 50 or moved further away from the nozzles 418, 518 by means of a bar or beam (not shown). If the device 40, 50 identifies angular accelerations around the pitching or yawing axes (by means of instruments for detecting accelerations such as those described below), the corresponding rocket is ignited to produce a thrust in the opposite direction. The system is designed so that the rocket has a "balancing" effect and is ignited with a delay that takes the angular acceleration due to the misalignment and the maximum potential rocket ignition delay into account. The thrust produced as a result induces an acceleration sufficient to restore the direction of the thrust vector to the initially required position. Since the total operating time of the device 40, 50 is very limited, the operating time and thrust of the non-reusable auxiliary balancing rockets are calculated so as to avoid an excessive reaction. In the event of error, the opposite rocket to the one used for the correction can be ignited to produce a further counter-thrust. The correction of the thrust vector misalignment can thus be achieved using rockets placed both in contact with the housing to obtain a stabilising rotation and in the vicinity of the nozzle for balancing purposes, or adopting only one of the two solutions.

In a further embodiment (not shown), defined as 'independent', the device according to the present invention generates the arming and ignition signals unassisted, without any aid from a station on Earth or other stations in Space. This embodiment can be achieved starting from one of the previously-described embodiments and/or with portions thereof. It differs, however, in the different functions of the on-board control means of the device because the means for receiving control signals do not receive the ignition signals but these are generated independently by the device in a predefined instant or at predefined conditions.

The device according to the present invention functions independently from the satellite 20', 20", and the purpose of these means for receiving signals is not to receive signals relating to the arming and/or ignition of the device from stations on Earth or other space vehicles, but only to receive signals for the purpose of stopping the device independent operating sequence, as described in detail below. Provision can be made for said means for receiving control signals to be capable of receiving signals from external emitters for the purpose of interrupting the ignition procedure and enabling its subsequent remote control. In this embodiment, the on-board control means include means for emitting control signals that have been pre-programmed and/or calculated by the on-board control means and for sending them to the means for receiving control signals. The latter, being associated also with the propulsion means, then effect the arming and ignition of the device 10, thus enabling the igniter independently.

The means for emitting the control signals are in the form of electronic controllers and preferably comprise an ignition-enabling timer adjusted to suit the working life of the satellite 20', 20" or the duration of its mission. Alternatively, the timing of the de-orbiting procedure can be calculated by the on-board control means on receipt of warning signals from sensors optionally fitted on the device according to the present invention, as described later on.

In another embodiment (not shown), termed semi-independent, the device according to the present invention receives the arming signal from a station on Earth or from other vehicles located in Space. This embodiment consequently has a structural configuration and components similar to the device 10 described in the first embodiment, except that the ignition signal is generated independently by the device according to the present invention. The embodiment described herein also has means for emitting control signals as described and implemented in the previous embodiment. These means for emitting control signals send the means for receiving control signals an ignition signal generated by the on-board control means after receiving the arming signal from the station on Earth or from another vehicle in Space.

All the embodiments illustrated and described may also comprise optional means for improving the functional characteristics of, or adding new features to the device according to the present invention and the system deriving from its coupling with the satellite 20', 20". One implementation of the characteristics of the device according to the present invention in one or more of the previously-described embodiments includes telecommunication means that also enable the exchange of commands and signals with the satellite 20', 20" with which the device is coupled, although the latter remains totally independent of the former.

In one or more of the embodiments described herein, the device according to the present invention preferably also comprises first detection means, operatively connected with the on-board control means, for detecting other objects coming within a defined safety zone around the device and/or the satellite 20', 20" with which it is coupled. Even more preferably, the device according to the present invention includes means for communicating with the satellite 20', with which it is coupled for the purposes of detecting any impact damage to the satellite.

The device preferably also includes third detection means, operatively connected with the on-board control means, for detecting any malfunctions in the satellite 20', 20" with the aid of the means of communication therewith.

The device according to the present invention also comprises second detection means, operatively connected with the on-board control means, for detecting impact damage to the device itself.

In one or more of the embodiments illustrated and/or described, and in combination with one or more of the above-mentioned technical implementations, the device according to the present invention may additionally include fourth detection means, operatively connected with the on-board control means, designed to detect the orientation in time and/or the orbit of the device according to the present invention at any time, or at pre-set times, or to detect the position in Space of the device according to the present invention. These fourth detection means are preferably operatively connected with an orientation and position monitoring unit also used to independently establish the position and orientation of the device and of the satellite 20', 20" with which it is coupled. This unit is used to increase the precision of the calculation of the system's orientation and position in order to reduce any errors in the calculation of the re-entry trajectory. Another purpose of this unit is to send instructions to the means for mitigating the thrust vector misalignment and/or to the means for actively controlling the thrust vector on the adjustable mechanical coupling means. The unit is designed to be immune to electromagnetic interferences and radiation occurring in Space.

These sensors are preferably also operatively connected with status monitoring means. They collect the results of electrical tests coming from the means installed in the device according to the present invention as well as the signals coming from the previously-described monitoring sensors. The collected data are sent, on request or at regular intervals, to the control interface located at a station on Earth, or to another space vehicle, using the telecommunication means with which the device is equipped. Alternatively, the device according to the present invention may send these data to the satellite 20', 20" with which it is associated, exploiting said satellite's communication means. This communication may also be two-directional, so that the satellite 20', 20" can send control signals to the device.

With reference to the embodiments in FIGS. 13 and 15, the Figures show two containment means 492', 492", 592, in the form of parallelepiped-shaped containers coupled with the head portion of the housing for the device 40, 50. These containment means preferably contain electric power supply means (such as non-rechargeable batteries), the on-board control means and the telecommunication means as described previously. These containment means 492', 492", 592 may also contain the status-monitoring means and the means for actively controlling the thrust, as well as any additional means for attitude detection and control, and the means for mitigating the thrust vector misalignment. These containment means 492', 492", 592 may be positioned either in the terminal portion of the device's housing or at the tail, near the nozzle.

In a further embodiment (not shown), the device may include a system for positioning the satellite with which it is coupled (or emergency de-tumbling system—EDS) so as to ensure that the satellite's attitude is appropriate and stable before the device is ignited. This system may prove necessary if the satellite's attitude is out of control or if it's attitude is such that the direction of the thrust generated by the device is not aligned with the orbital velocity and the satellite makes any further manoeuvres impossible. The system is powered by one or more gas generator cartridges charged with solid propellant, ignited by means of an electrical explosive device (with the addition of a suitable pyrotechnical mixture, if necessary) and is operatively connected with the on-board control means governing the device's ignition.

In its various possible embodiments, the device according to the present invention is used to prevent the further accumulation of debris in orbit and the risk of damage to persons or property caused by the uncontrolled re-entry to Earth of satellites, space vehicles or parts thereof.

In particular, the device 10 is capable of changing the trajectory of the satellite 20', 20" with which it is associated when the latter reaches the end of its working life or develops a malfunction. As illustrated in FIG. 1, this change of trajectory enables the satellite to be de-orbited directly towards Earth 1, where it disintegrates as it moves through the atmosphere or can land within an area of arbitrarily-defined or previously-established dimensions. The de-orbiting procedure may involve redirecting the satellite towards a safe area in Space, defined as a cemetery or parking orbit. As shown in FIG. 1, if the orbit of the satellite 20' is low 2 and the change of trajectory consists in de-orbiting it towards the celestial body at the centre 1, or towards a lower orbit, then the device 10 generates a thrust partially or completely aimed in the opposite direction to that of the orbital velocity vector (in the direction of flight) of the satellite 20'. If, on the other hand, the orbit of the satellite 20" is high 3, then the change of trajectory consists in relocating the satellite 20" to a parking orbit or cemetery 4 further away from the planet Earth 1. In this case, the direction of the thrust generated by the device 10 will be in the same direction as the orbital velocity vector. For both types of de-orbiting procedure, the satellite 20', 20" will follow a specific trajectory calculated and established before any steps are taken to modify its orbit so as to avoid posing a risk to other satellites or space vehicles, persons or property, be they in Space or on Earth 1.

The device 10 is installed on the satellite 20', 20" before it is launched. This assembly is achieved before the launch using means 310 for mechanically coupling said device 10 to the satellite 20', 20" to be de-orbited. In particular, the device 10 may be coupled in front of the satellite 20' if it has to be moved from a low orbit 2 towards Earth 1; or the device 10 may be coupled behind the satellite 20" if it is necessary to move the satellite from a high orbit 3 towards a parking orbit 4.

The mechanical coupling of the device to the satellite 20', 20" does not entail any dependence thereon. In fact, the device according to the present invention can operate independently or semi-independently, or it can be remote-controlled.

The solid-propellant propulsion means provide the impulse needed to move the satellite 20', 20" from its mission orbit, while a fixed or adjustable mechanical coupling platform (it is adjusted before the launch, and subsequently passive or active because it is under feedback control during the operation of the thruster) enables the direction of the thrust generated by the propulsion means to be controlled, if necessary.

The device may operate in three different operating mode: remote-controlled mode, independent mode and semi-independent mode. All the three modes effect the de-orbiting/re-orbiting operations in just few steps:

calculating, through a remote control means or by said device, a desired new space orbit or a desired trajectory causing to an impact Earth area, respectively;

calculating, through a remote control means or by said device, the instant to activate the moving/removing device to get the desired new orbit or trajectory based on the actual orbit of the satellite;

sending from said remote control means to said moving/removing device a control signal or starting the deorbiting/reorbiting procedure by said device to move the satellite in the calculated new orbit or trajectory;

igniting the propulsion means of the moving/removing device at the calculated instant when it receives the control signal.

Figure 17:
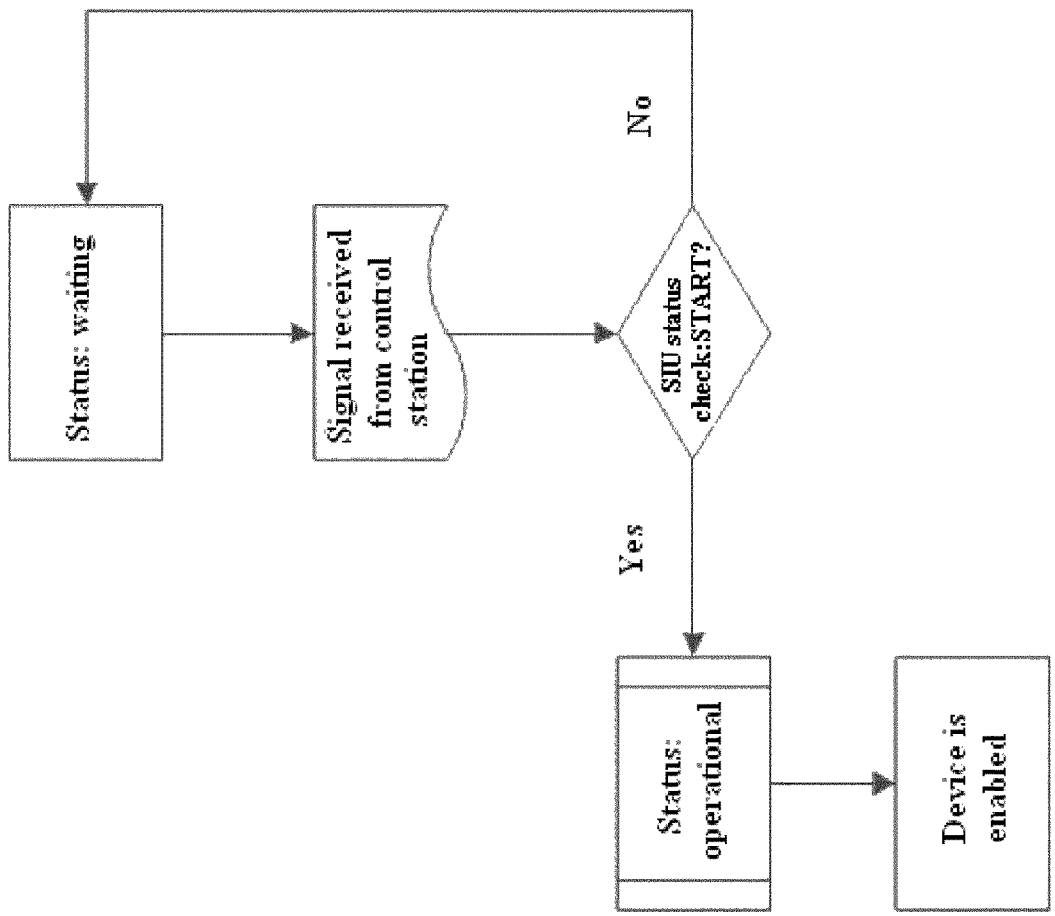
FIG. 17 shows a flowchart of the controls for the basic operation of the device according to the present invention.

In the preferred operating mode, the device according to the present invention is remote-controlled. As shown in the flowchart in FIG. 17, the control procedure needed for the device 10 to effect the de-orbiting/re-orbiting is guided by remote control means, that in the simplest case consist of a control station on Earth.

Figure 16:
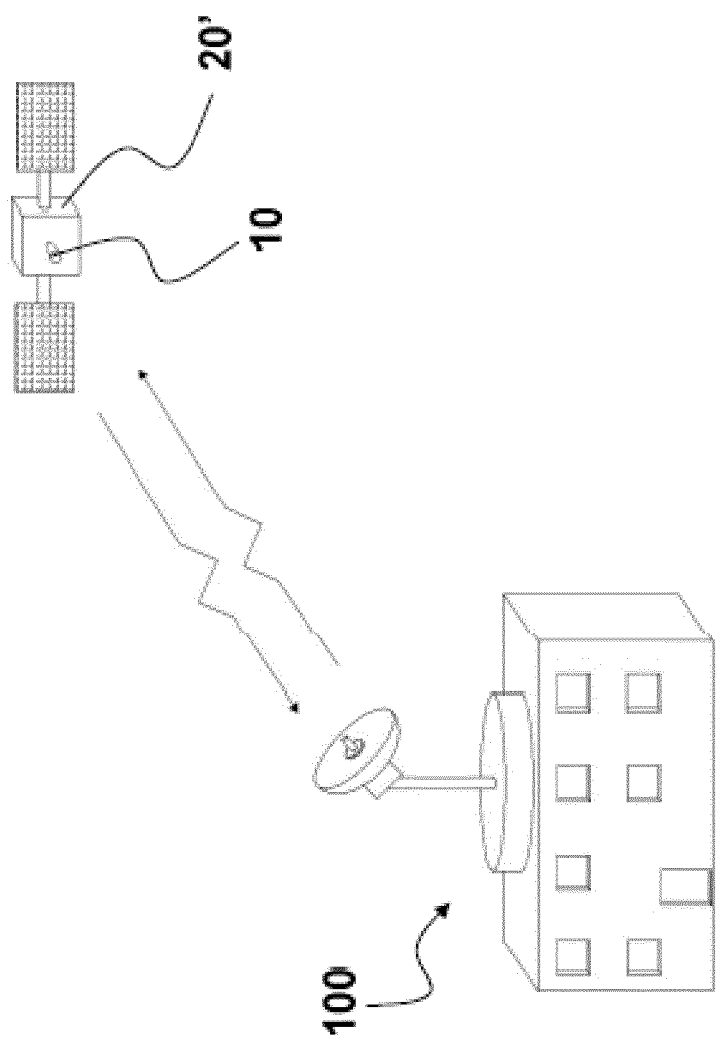
FIG. 16 is a schematic representation of the exchange of control signals and/or information between a station on Earth and the device for its remote control according to the present invention.

During the working life of the satellite 20' the device 10 remains in a WAITING state, until it receives a signal from the station on Earth 100, as the remote control means. When it receives the signal, the on-board control means verify the status of the SIU (if any). If its status is START, this means that the system is armed and the procedure for igniting the device 10 begins at the time established by the signal received and the satellite is de-orbited/re-orbited safely and in a controlled manner, i.e. it is placed in a specifically calculated re-entry orbit. If this is not the case, due to an unintentional signal, for instance, or if the device 10 has not yet been armed, then the ignition signal is ignored and the device 10 returns to its WAITING state. Sending a safety signal from the remote control means to the means for receiving control signals of the moving/removing device permits to switch the device to an operative state before sending the control signal to move the satellite in the calculated new orbit or trajectory. Said signals may be in an encrypted mode to secure the transmission and prevent the anti-intrusion and unauthorised ignition. With reference to FIG. 16, when it has been decided to de-orbit the satellite 20', a sequence of signals is sent to the device 10 from the station on Earth 100 and/or from another vehicle in Space. These signals are received by the means for receiving control signals operatively connected with the on-board control means of the device 10. On receipt of this sequence of signals, the on-board control means enable the SIU, which in turn enables the igniter 216, which consequently ignites the thruster. In particular, a high-voltage igniter is preferably used. The SIU, enabled by the arming signal, charges a capacitor until it reaches a high-voltage state characteristic of the armed status. When the capacitor is suddenly discharged as a result of a subsequent independent ignition signal, the metallic conductor layer on the membrane is vaporised by the high-voltage current and the plastic membrane is thrown at great speed against the principal layer of explosive, making it ignite.

Figure 18:
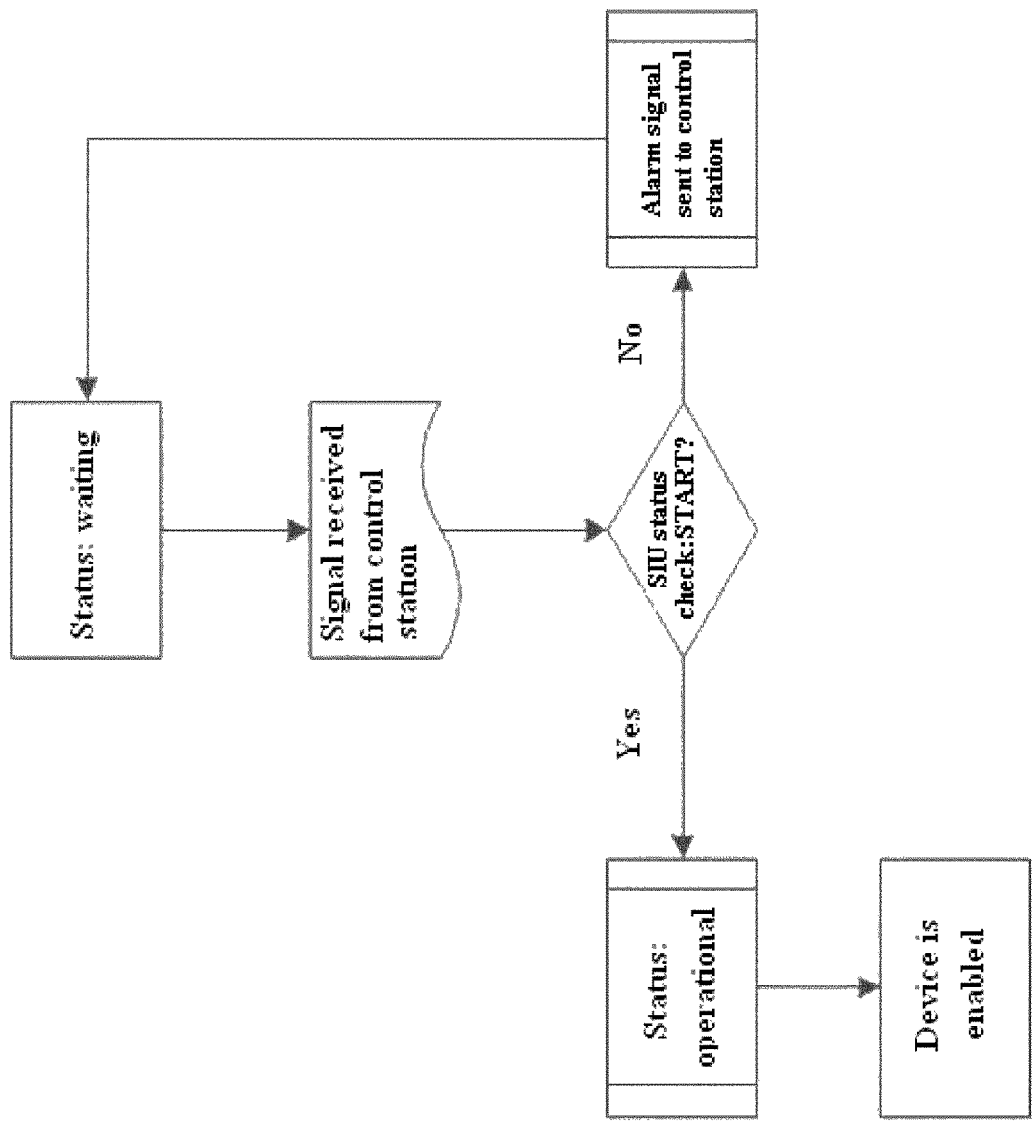
FIG. 18 shows an extended flowchart of controls with respect to the representation in FIG. 17.
Figure 19:
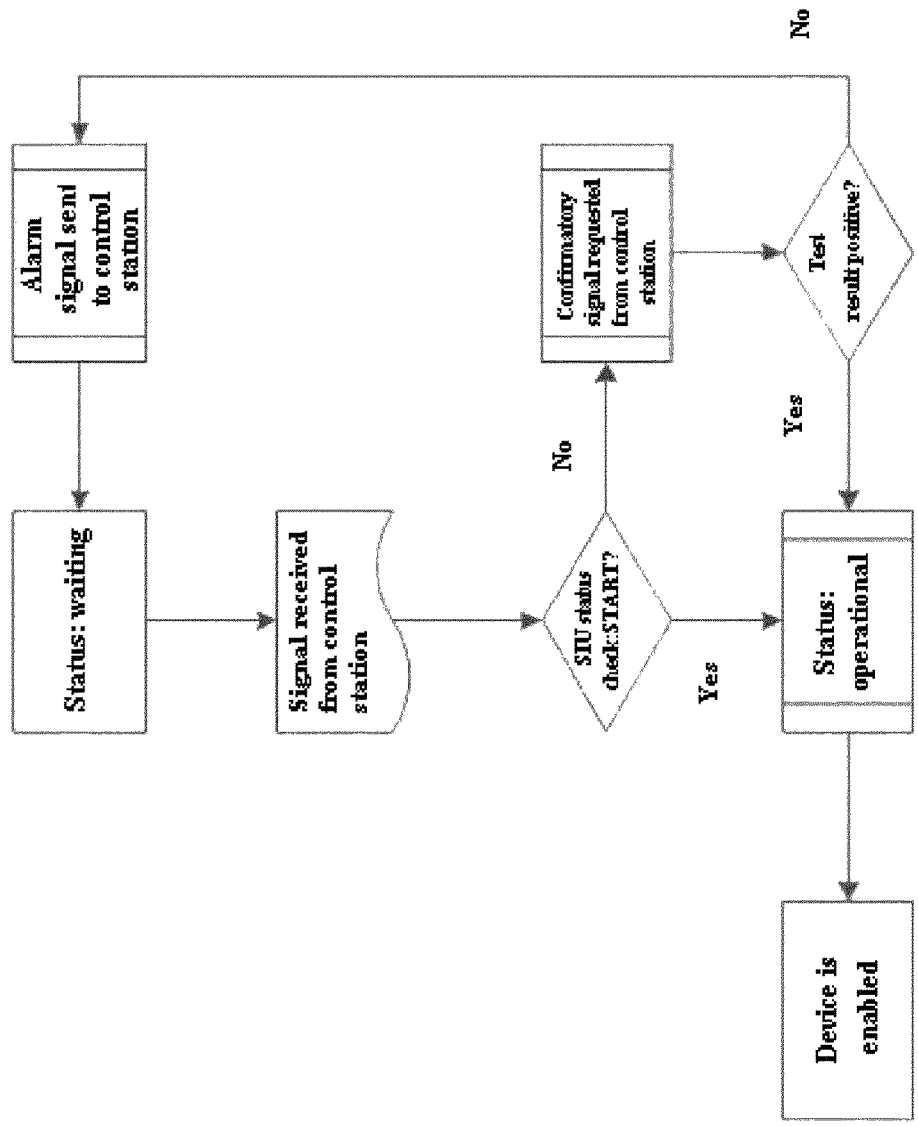
FIG. 19 shows an extended flowchart of controls with respect to the representation in FIG. 18.
Figure 20:
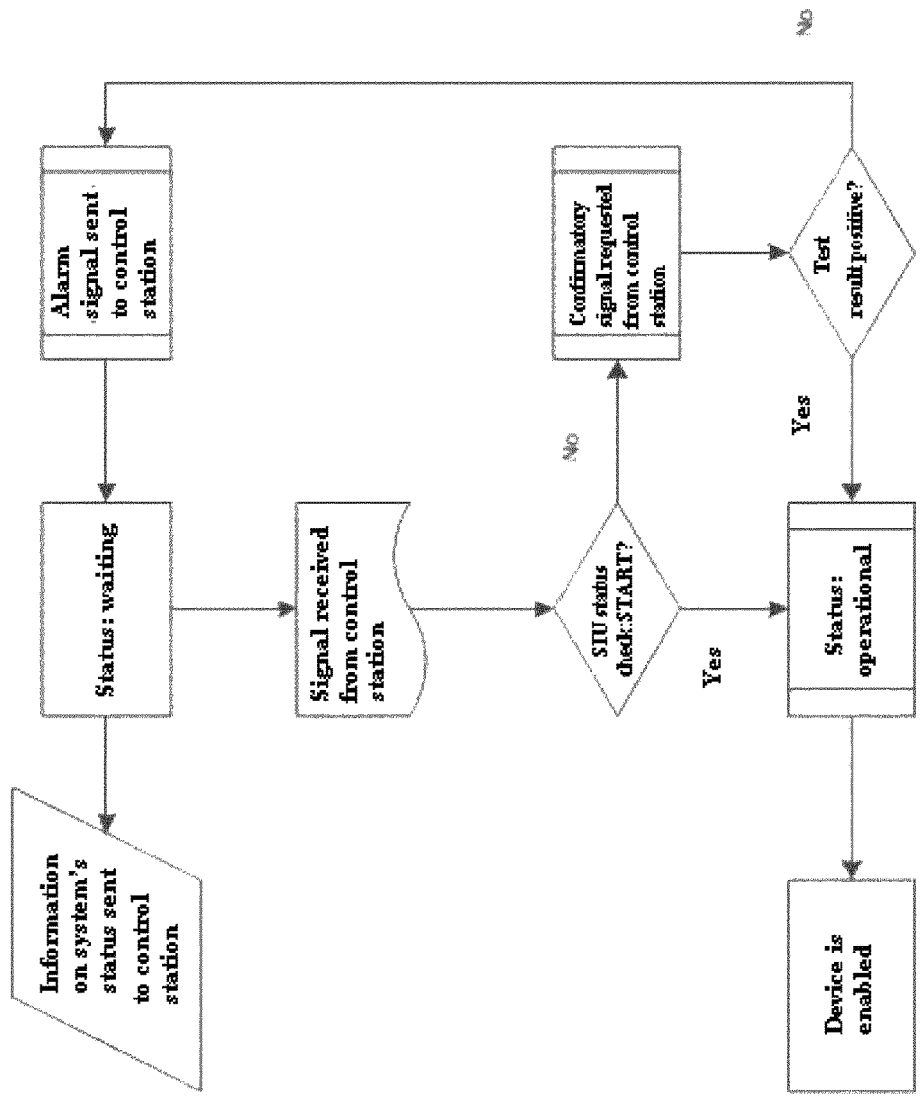
FIG. 20 shows an extended flowchart of controls with respect to the representation in FIG. 19.

Alternatively, the device 10 may be fitted with a low-voltage igniter. In this case, the electric wire of the igniter is heated and dissolved by a flow of current (typically a few amperes at low voltage for a few milliseconds) that represents the ignition signal. This ignites the pyrotechnical mixture contained in the igniter. The capsule thus releases the products of combustion, sending them towards the igniter's principal charge and igniting the solid propellant 212 in the thruster as a result. This provides a thrust sufficient to position the satellite 20' in a desirable re-entry orbit so that it will land on Earth 1 or disintegrate in the atmosphere. Alternatively, the thrust of the device will suffice to relocate the device-satellite system to a previously-established safe orbiting space, such as a cemetery or parking orbit 4. In this preferred operating mode, the allowable de-orbiting window is calculated by the station on Earth 100. Alternatively, it may be calculated by another vehicle located in Space. This allowable de-orbiting window takes into account the position of the device-satellite system when the decision to proceed with de-orbiting is taken. The calculation of the allowable de-orbiting window also takes into account the other objects in Space, such as other satellites or spacecraft, or debris, to avoid the device-satellite system occupying a trajectory that would make it collide with any such objects. The sequence of signals sent by the station 100 to the device 10 thus comprises at least one arming signal and subsequently at least one ignition signal, both sent once the decision to de-orbit has been made and when the allowable window is available. The orbital trajectory is calculated taking into account the orbital position and orientation of the device at the instant in which the de-orbiting is to take place, possibly exploiting the fourth sensors, if available. The flowchart shown in FIG. 18 extends the operations already illustrated in FIG. 17. After receiving the signal and checking that the status of the SIU is STOP, the device sends an alarm signal to the station on Earth 100 to warn that an attempt has been made to ignite the device 10 but the conditions needed for this to occur have not been met. In the flowchart shown in FIG. 19 the number of operations performed or required during the period in which the device is operational is further extended. To reduce any risks of failure of the SIU, if the status of the latter has been identified as STOP after the command to begin the ignition procedures has been received from the station on Earth 100, then a further request for confirmation of the signal is sent by the station on Earth 100. Finally, the device 10 may include a system for monitoring its status with the previously-described means and sensors, and the data collected can be sent to the station on Earth 100, as shown schematically in FIG. 20, either at regular intervals or on request.

In a second operating mode, the device is an autonomous device, i.e. with no control from the station on Earth or from another vehicle in Space, or from any remote control means. The device 40 independently generates the ignition sequence by means for emitting control signals with its own on-board control means after a pre-set time. This time interval usually corresponds to the useful working life of the satellite 20', 20" with which the device is associated and/or the duration of its mission. Alternatively, instead of being established in advance, said time could depend on threshold values being exceeded and alarm signals being sent by the sensors. Said threshold values may be exceeded, for instance, as a result of a severe malfunction, an impact (a mechanical shock identified by an accelerometer), or an imminent collision with another object in orbit (detected by a radar system at the station on Earth, or by proximity sensors on board the device, if any). In said second operating mode, the on-board control means will thus independently generate at least the arming signal and at least the ignition signal. In this operating mode, provision is also made for the station on Earth, or another space vehicle to be capable of stopping the ignition procedure by sending the device a STOP signal, which is received by the device's control signal receiving means. In addition, said station on Earth, or said other space vehicle, can reschedule the ignition sequence, sending the control signals as described for the previously-described preferred operating mode. For an independently-managed, safe removal from the orbit according to this second operating mode, the device 40 has to be capable of establishing its own position and orientation, and calculating a safe trajectory for re-entry in the atmosphere or towards a parking orbit, i.e. the device must be fitted with an orienting and positioning unit. Moreover, the device must be capable of assessing the allowable de-orbiting window in relation to other objects in Space that might be encountered along its trajectory, as explained previously.

A third operating mode involves a semi-independent operation of the device.

In this operating mode, some of the control signals are generated independently by the device with its own on-board control means. In particular, via the means for the emission of control signals, the device generates signals useful for arming the device. Once armed, the ignition signal is sent from a station on Earth, or in Space, or from other space vehicles. In particular, the ignition signals may also be sent by the satellite to be de-orbited/re-orbited in the embodiments with an operative connection for data exchange between the two.

According to one embodiment (not shown), before the device is ignited, if the satellite attitude were out of control (e.g. as a result of a malfunction of its attitude control system), the satellite positioning system would reduce the angular pitching and yawing velocities to negligible values and would align the direction of the thrust generated by the device with the orbital velocity. If, even with an active control of the satellite attitude, the pitching and yawing angles suffice to induce a misalignment between the thrust generated by the device and the orbital velocity, and the satellite is unable to modify its attitude to cancel said misalignment, the satellite positioning system can take action on the device itself to restore the satellite to the necessary attitude, enabling the device to generate the thrust in the required direction. The combustion of the cartridges installed in the system takes place in one or more cavities connected with two pairs of nozzles that enable rotation manoeuvres around the pitching and yawing axes. Each cavity for the cartridges is separated from the pair of nozzles by suitable valves. The valves could be of the solenoid type, opened and closed by regulating the current in a coil, but any other type of valve could be used providing it can be actuated quickly enough. When the single cartridge is ignited, its combustion takes place inside one of the cavities. With the valve closed, the pressure of the gas generated inside the cavity increases until the cartridge burns. When the valve opens, the gas under pressure tends to flow from the cavity into the nozzle. The diameters of the valve, of the connection tube leading to the nozzle and of the neck on the nozzle are sized so as to guarantee the expansion of the gas and its release through the opening in the nozzle at supersonic speed, thus generating the necessary thrust. The nozzles are located at a suitable distance from the pitching and yawing axes so that the required torque is generated along each axis after the gas has been discharged through the single nozzle. The ignition of the single cartridge is governed by the on-board control means. The opening and closing of the valves is managed by a feedback control system that uses the values of the attitude angles provided in real time by attitude detection and/or control means. These means are operatively connected with the satellite positioning system and function until the required attitude is reached. The cartridges of solid propellant are sized so as to generate gas at a sufficient pressure and for a sufficient time to enable the required attitude to be reached, starting from any initial condition in terms of the angles and angular velocities. In addition, said satellite positioning system may be used to actively correct the misalignment of the thrust vector.

The device according to the present invention operates with no support from the satellite with which it is associated that is to be de-orbited. The device can communicate directly with another space vehicle or orbiting station, or control station on Earth. The station on Earth can send commands for arming and igniting the device, or requests for data on the device-satellite system's status and (where available) data on the status of the satellite alone. An advantage of the device according to the present invention lies in its capacity to generate de-orbiting manoeuvres in a few simple steps.

The device according to the present invention thus enables an appropriate disposal of the satellite with which it is coupled at the end of the latter's mission. In particular, said disposal is achieved by removing the satellite from its working orbit or by de-orbiting the satellite towards Earth.

One advantage of the device according to the present invention relates to its ability to release the orbit previously occupied by a satellite, avoiding any interference with other satellites or space vehicles in the vicinity, which is an important advantage particularly for geostationary and geo-synchronous orbits.

Another advantage of the device according to the present invention lies in that it achieves a safe and controlled re-entry of the satellite to be deorbited, avoiding collision damage and preventing impact with persons or property on Earth, or with other space objects orbiting in the vicinity.

A de-orbiting/re-orbiting device according to the present invention has the advantage of eliminating malfunctioning satellites with which it is associated, which would have no other way of re-entering the atmosphere. In the case of a satellite that is severely damaged during its working life, the device according to the present invention enables the damaged satellite to be moved to a parking orbit or be brought back into the Earth's atmosphere, reducing the risk of it colliding with other satellites in operation.

The device according to the present invention advantageously eliminates the risk of satellites accidentally colliding with other known objects during their life cycle in orbit. If it is associated with a proximity sensor (e.g. radar), the device enables collisions with any, even previously unknown objects to be avoided should the latter come within a certain safety distance from the satellite concerned.

The device according to the present invention can advantageously be used to avoid intentional (or unintentional) destructive activities or other hazardous operations, including the intentional destruction of a satellite, space vehicle or orbital stage by means of a deliberate collision, for instance, or other activities that could increase the risk of collision with other objects in Space.

The device can be used at any time to change the orbit of the satellite with which it is associated, or as a supporting device in the event of a failure of the satellite's propulsion means when it is launched. If the engine of the final stage should prove to be defective, the device can be used as a backup propulsion system, enabling the satellite to reach its planned orbit or a backup orbit for completing all or part of the planned mission.

The device according to the present invention thus enables the unassisted deorbiting of a space vehicle simply by means of a pre-programming of the device itself, or receiving at least one remote-control directly from a station on Earth and with no limitations. The same control can also be sent by a vehicle in Space, or even by the satellite to be de-orbited with which the device is mechanically coupled.

The device according to the present invention advantageously enables the satellite to be deorbited to return to a predefined, safe location on Earth, far away from areas populated by human beings or densely occupied by buildings.

Its construction is designed to ensure that it lasts longer than the mission of the satellite with which it is associated and, in extreme situations, it may be used as a backup system to increase the satellite's useful mission time by 20% to 80% in the event of a failure of the satellite's propulsion systems at the time of its launch.

Finally, the modular design of the device according to the present invention enables it to be adapted to the deorbiting needs of the satellite with which it is associated.

Furthermore, the method according to the invention allows to implement the action of de-orbiting/re-orbiting a satellite by an associated autonomous device.

The method allows a simple and controlled de-orbiting/re-orbiting of the satellite, by calculating "a priori" a safety impact area on the Earth or a new space orbit.

The invention claimed is:

1. A method of controlled and safe removal of an artificial satellite from a mission orbit around a celestial body when the artificial satellite reaches an end of useful life or when the artificial satellite becomes faulty, the mission orbit being an orbit assigned to the artificial satellite for operations required during a stay thereof in space, the method comprising:

providing a moving/removing device that is autonomous and independent from the artificial satellite for removing the artificial satellite from the mission orbit, the moving/removing device comprising:
a control device for controlling the moving/removing device, the control device comprising an electronic board comprising microcontrollers, and the control device being independent of a control device of the artificial satellite; and
a propulsion device for providing thrust for removing the artificial satellite from the mission orbit, the propulsion device being independent of a propulsion device of the artificial satellite;

coupling the moving/removing device to the artificial satellite prior to launch via an adjustable mechanical connection between the moving/removing device and the artificial satellite, the adjustable mechanical connection being configured to be adjusted to mitigate misalignment of a thrust vector of the propulsion device with a center of gravity of a combination of the artificial satellite and the moving/removing device, and the artificial satellite being a single satellite;

wherein the moving/removing device is permanently coupled to the artificial satellite in a manner so as to be located external relative to the artificial satellite and protrude therefrom while remaining attached to the artificial satellite during operation at the mission orbit and while removing the artificial satellite from the mission orbit;

calculating a desired trajectory causing the artificial satellite to impact the celestial body and calculating a time to ignite the propulsion device to achieve the desired trajectory based on an actual orbit of the artificial satellite;

controlling the moving/removing device via the control device to ignite the propulsion device based on the calculated time to move the artificial satellite to impact the celestial body when the artificial satellite reaches an end of useful life or when the artificial satellite becomes faulty; and adjusting the adjustable mechanical connection between the moving/removing device and the artificial satellite without employing a component of the artificial satellite to mitigate misalignment of the thrust vector of the propulsion device when the propulsion device is ignited.

2. The method of claim 1, wherein the desired trajectory causes the artificial satellite to impact a desired location on the celestial body.

3. The method of claim 1, wherein the moving/removing device is coupled to a side of the artificial satellite facing away from the celestial body when the artificial satellite is in orbit.

4. A method of controlled and safe removal of an artificial satellite from a mission orbit around a celestial body when the artificial satellite reaches an end of useful life or when the artificial satellite becomes faulty, the mission orbit being an orbit assigned to the artificial satellite for operations required during a stay thereof in space, the method comprising:
  providing a moving/removing device that is autonomous and independent from the artificial satellite for removing the artificial satellite from the mission orbit, the moving/removing device comprising:
    a control device for controlling the moving/removing device, the control device comprising an electronic board comprising microcontrollers, and the control device being independent of a control device of the artificial satellite; and
    a propulsion device for providing thrust for removing the artificial satellite from the mission orbit, the propulsion device being independent of a propulsion device of the artificial satellite;
  coupling the moving/removing device to the artificial satellite prior to launch via an adjustable mechanical connection between the moving/removing device and the artificial satellite, the adjustable mechanical connection being configured to be adjusted to mitigate misalignment of a thrust vector of the propulsion device with a center of gravity of a combination of the artificial satellite and the moving/removing device, and the artificial satellite being a single satellite;
  wherein the moving/removing device is permanently coupled to the artificial satellite in a manner so as to be located external relative to the artificial satellite and protrude therefrom while remaining attached to the artificial satellite during operation at the mission orbit and while removing the artificial satellite from the mission orbit;
  calculating a desired new space orbit and calculating a time to ignite the propulsion device to achieve the desired new space orbit based on an actual orbit of the artificial satellite;
  controlling the moving/removing device via the control device to ignite the propulsion device based on the calculated time to move the artificial satellite to the desired new space orbit when the artificial satellite reaches an end of useful life or when the artificial satellite becomes faulty; and
  adjusting the adjustable mechanical connection between the moving/removing device and the artificial satellite without employing a component of the artificial satellite to mitigate misalignment of the thrust vector of the propulsion device when the propulsion device is ignited.

5. The method of claim 4, wherein the desired new space orbit is a parking orbit, the parking orbit being an orbit at which the artificial satellite can remain without causing damage or occupying space that is useful to other satellites or space vehicles.

6. The method of claim 4, wherein the moving/removing device is coupled to a side of the artificial satellite facing towards the celestial body when the artificial satellite is in orbit.

7. The method of claim 4, wherein the propulsion device can be ignited only once.

8. The method of claim 4, further comprising: locking the adjustable mechanical connection after adjustment thereof prior to launch of the artificial satellite.

9. The method of claim 4, wherein the thrust vector of the propulsion device is controlled actively by adjusting the adjustable mechanical connection under feedback control during operation of the propulsion device.

10. The method of claim 4, wherein the propulsion device is ignited only when a safety signal is received by the moving/removing device.

11. The method of claim 4, wherein the propulsion device comprises at least one solid propellant engine and at least one igniter for igniting the at least one solid propellant engine.

12. The method of claim 4, further comprising:
  sending a safety signal remotely to the moving/removing device to activate an operative state before controlling the moving/removing device to ignite the propulsion device.

13. The method of claim 4, wherein at least one of calculating a desired new space orbit, calculating a desired trajectory and calculating a time to ignite the propulsion device is performed remotely.

14. The method of claim 4, wherein at least one of calculating a desired new space orbit, calculating a desired trajectory and calculating a time to ignite the propulsion device is performed by the moving/removing device.

15. The method of claim 4, wherein the adjustable mechanical connection is an adjustable platform located between the moving/removing device and the artificial satellite.

* * * * *